US006775581B2

(12) United States Patent
Landers et al.

(10) Patent No.: US 6,775,581 B2
(45) Date of Patent: Aug. 10, 2004

(54) HORIZONTALLY-STRUCTURED CAD/CAM MODELING FOR VIRTUAL CONCURRENT PRODUCT AND PROCESS DESIGN

(75) Inventors: Diane M. Landers, Frankenmuth, MI (US); Pravin Khurana, Rochester, MI (US)

(73) Assignee: Delphi Technologies, Inc., Troy, MI (US)

( * ) Notice: Subject to any disclaimer, the term of this patent is extended or adjusted under 35 U.S.C. 154(b) by 23 days.

(21) Appl. No.: 10/001,748

(22) Filed: Oct. 24, 2001

(65) Prior Publication Data

US 2003/0004596 A1 Jan. 2, 2003

Related U.S. Application Data

(60) Provisional application No. 60/276,255, filed on Mar. 14, 2001.

(51) Int. Cl.[7] ................................................ G06F 19/00
(52) U.S. Cl. ..................... 700/98; 700/96; 700/182; 700/86; 703/1
(58) Field of Search ............................. 700/18, 19, 29, 700/30, 83, 86, 95–98, 105, 106, 107, 146, 159, 160, 181–187, 190, 192; 703/1

(56) References Cited

U.S. PATENT DOCUMENTS

| 5,351,196 A | | 9/1994 | Sowar et al. | ........... 364/474.24 |
| 5,434,791 A | * | 7/1995 | Koko et al. | ................. 364/468 |

(List continued on next page.)

OTHER PUBLICATIONS

William H. Beyer, Ph.D., editor; CRC Handbook of Mathematical Sciences, 5th Edition, 1978, pp. 354–355.

(List continued on next page.)

Primary Examiner—Leo Picard
Assistant Examiner—Sean Shechtman
(74) Attorney, Agent, or Firm—Michael D. Smith

(57) ABSTRACT

Disclosed herein is a method of horizontally structured CAD/CAM modeling and manufacturing for concurrent product and process design, comprising: selecting a blank for machining into an actual part establishing a coordinate system; and creating a master product and process concurrent model comprising: a virtual blank corresponding to the blank; a manufacturing feature; virtual machining of the manufacturing feature into the virtual blank; where the manufacturing feature exhibits an associative relationship with the coordinate system. The method also includes generating a product drawing of the actual part; and generating machining instructions to create the actual part by machining the manufacturing feature into the blank. Also disclosed herein is a horizontally structured CAD/CAM model for concurrent product and manufacturing processes comprising: a blank for machining into an actual part; a coordinate system; and a master product and process concurrent model comprising: a virtual blank corresponding to the blank; a manufacturing feature; the manufacturing feature virtual machined into the virtual blank; and the manufacturing feature exhibiting an associative relationship with the coordinate system. Further disclosed is a storage medium encoded with a machine-readable computer program code for horizontally structured CAD/CAM modeling. The storage medium including instructions for causing a computer to implement the method of horizontally structured CAD/CAM modeling and manufacturing for concurrent product and process design. Additionally disclosed is a computer data signal for horizontally structured CAD/CAM modeling. The computer data signal comprising code configured to cause a processor to implement a method of horizontally structured CAD/CAM modeling and manufacturing for concurrent product and process design.

78 Claims, 11 Drawing Sheets

U.S. PATENT DOCUMENTS

| | | | |
|---|---|---|---|
| 5,467,293 A | | 11/1995 | Summer et al. ............ 364/578 |
| 5,659,493 A | * | 8/1997 | Kiridena et al. ............ 364/578 |
| 5,710,709 A | | 1/1998 | Oliver et al. .......... 364/474.26 |
| 5,768,136 A | | 6/1998 | Fujiwara et al. ....... 364/474.24 |
| 5,808,432 A | | 9/1998 | Inoue et al. ................ 318/561 |
| 5,815,154 A | | 9/1998 | Hirschtick et al. .......... 345/356 |
| 6,073,056 A | | 6/2000 | Gawronski et al. ........... 700/98 |
| 6,120,171 A | | 9/2000 | Shaikh .................. 364/468.04 |
| 6,219,049 B1 | | 4/2001 | Zuffante et al. ............ 345/339 |
| 6,219,055 B1 | | 4/2001 | Bhargava et al. ........... 345/355 |
| 6,323,863 B1 | | 11/2001 | Shinagawa et al. ......... 345/441 |
| 6,341,153 B1 | | 1/2002 | Rivera et al. .................. 378/4 |
| 6,356,800 B1 | * | 3/2002 | Monz et al. ................ 700/184 |
| 6,430,455 B1 | * | 8/2002 | Rebello et al. ............. 700/105 |
| 2002/0133252 A1 | * | 9/2002 | Landers et al. ............... 700/97 |
| 2002/0133264 A1 | * | 9/2002 | Maiteh et al. .............. 700/182 |
| 2002/0133265 A1 | * | 9/2002 | Landers et al. ............. 700/182 |
| 2002/0133267 A1 | * | 9/2002 | Landers ...................... 700/182 |
| 2003/0033041 A1 | * | 2/2003 | Richey ........................ 700/98 |

OTHER PUBLICATIONS

Sridhar S. Condoor, "Integrating Design in Engineering Graphics Courses Using Feature–Based, Parametric Solid Modeling," ASEE/IEEE Frontiers in Education Conference 12d2–13; 1999; pp. 12d–13–12d2–17.

Chih–Hsing Chu and Chun–Fong You; "Operation Planning in NC Programming Based on CAD Systems," found at http://dnclab.berkeley.edu/lma/people/chchu/paper/NCoptim.html.

Solid Edge User's Guide Version 10 2001.

What's New in Unigraphics V17.0 User Guide 2000.

Hemmett, Fussell, Jerard: "A Robust and Efficient Approach to Feedrate Selection for 3–axis Machining" ASME International Mechanical Engineering Congress and Exposition, Nov. 2000.

Roth D et al: "Surface swept by a toroidal cutter during 5–axis machining" Computer Aided Design, Elsevier Publishers BV., Barking, GB, vol. 33, No. 1, Jan. 2001, pp. 57–63.

Spence A D et al: "Integrated solid modeller based solutions for machining" Computer Aided Design, Elsevier Publishers BV., Barking, GB, vol. 32, No. 8–9, Aug. 2000, pp. 553–568.

Wang W P et al: "Geometric Modeling for Swept Volume of Moving Solids" IEEE Computer Graphics and Applications, IEEE Inc. New York, US, vol. 6, No. 12, Dec. 1, 1986, pp. 8–17.

* cited by examiner

HORIZONTALLY-STRUCTURED CAD/CAM MODELING FOR VIRTUAL CONCURRENT PRODUCT AND PROCESS DESIGN

CROSS-REFERENCE TO RELATED APPLICATIONS

This application claims the benefit of U.S. provisional application No. 60/276,255, filed Mar. 14, 2001 the contents of which are incorporated by reference herein in their entirety.

BACKGROUND

This invention relates to Computer-Aided Design and Computer-Aided Manufacturing (CAD/CAM) methods. CAD/CAM software systems are long known in the computer art. Some utilize wire-and-frame methods of building models while others utilize form features. Typically, in the form feature method of building CAD/CAM models, physical features are added to the model in an associative relationship with whatever other feature they are immediately attached to. Unfortunately, then, the alteration or deletion of any one feature will result in the alteration or deletion of any other features attached to it. This makes altering or correcting complicated models extensive and time-consuming.

BRIEF SUMMARY

Disclosed herein is a method of horizontally structured CAD/CAM modeling and manufacturing for concurrent product and process design, comprising: selecting a blank for machining into an actual part establishing a coordinate system; creating a master product and process concurrent model comprising: a virtual blank corresponding to the blank; a manufacturing feature; virtual machining of the manufacturing feature into the virtual blank; where the manufacturing feature exhibits an associative relationship with the coordinate system. The method also includes generating a product drawing of the actual part; and generating machining instructions to create the actual part by machining the manufacturing feature into the blank.

Also disclosed herein is a horizontally structured CAD/CAM model for concurrent product and manufacturing processes comprising: a blank for machining into an actual part; a coordinate system; and a master product and process concurrent model comprising: a virtual blank corresponding to the blank; a manufacturing feature; the manufacturing feature virtual machined into the virtual blank; and the manufacturing feature exhibiting an associative relationship with the coordinate system.

Further disclosed is a storage medium encoded with a machine-readable computer program code for horizontally structured CAD/CAM modeling. The storage medium including instructions for causing a computer to implement the method of horizontally structured CAD/CAM modeling and manufacturing for concurrent product and process design.

Additionally disclosed is a computer data signal for horizontally structured CAD/CAM modeling. The computer data signal comprising code configured to cause a processor to implement a method of horizontally structured CAD/CAM modeling and manufacturing for concurrent product and process design.

DETAILED DESCRIPTION OF AN EXEMPLARY EMBODIMENT

Figure 1:
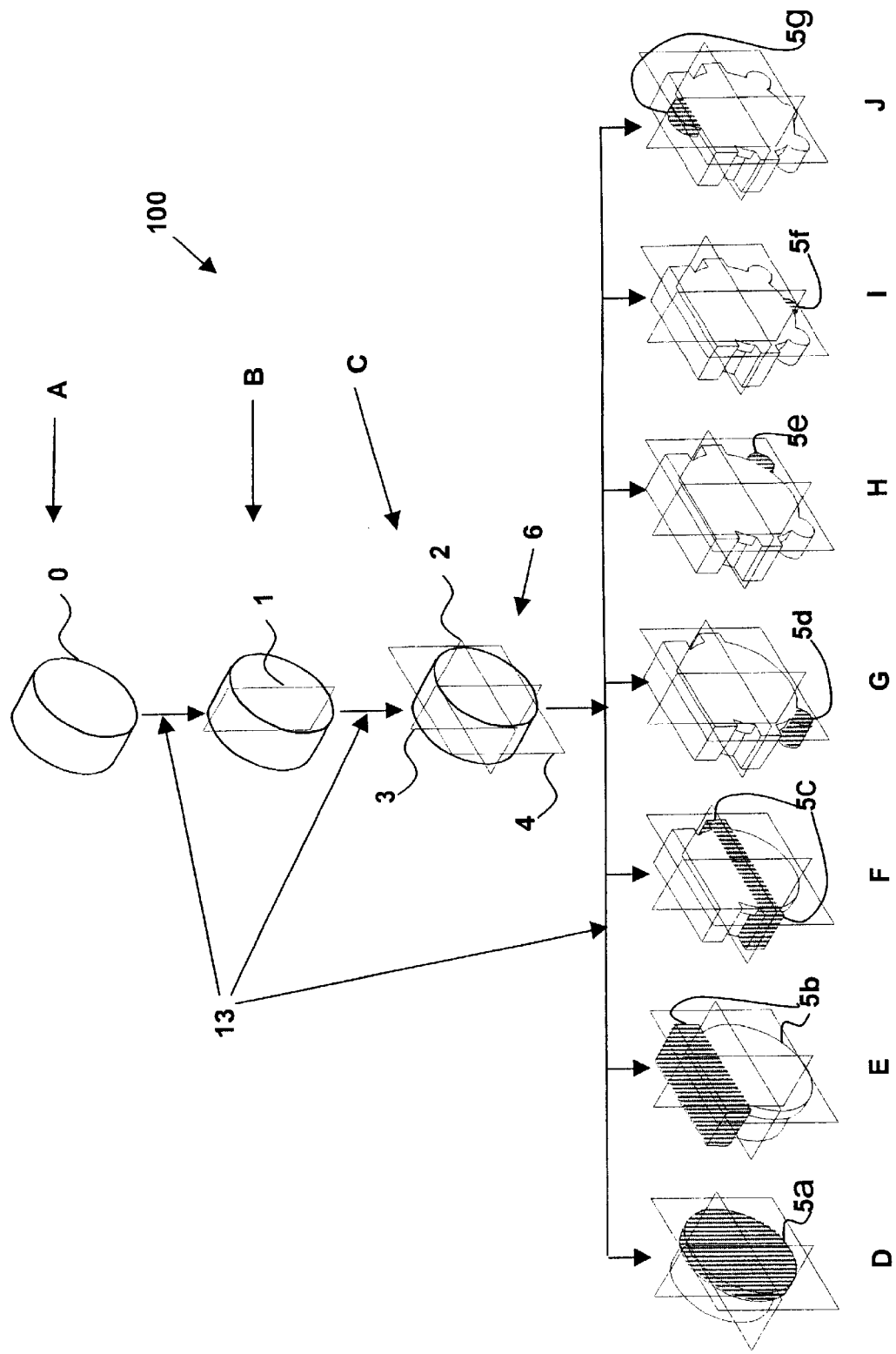
FIG. 1 is a schematic of the horizontal modeling method.

Disclosed herein is a horizontal method of computer-aided design and computer aided manufacture (CAD/CAM) modeling that is superior over the modeling employing vertical methods. The disclosed embodiments permit alterations, additions, and deletions of individual features (e.g., holes, bosses, etc.) of a virtual part, wherein a change in any one feature is independent of the remaining features. The disclosed method may be implemented on any CAD/CAM software package that supports (a) reference planes or their Cartesian equivalents, (b) parametric modeling or its equivalent, and (c) feature modeling or its equivalents.

A "horizontal tree structure" is employed to add form features to a model, preferably by establishing an exclusive parent/child relationship between a set of reference planes and each form feature. The reference planes themselves may, but need not be, children of a parent base model that may correspond to a real-world part or blank in the manufacturing process of the model. The parent/child relationship means that changes to the parent will affect the child, but changes to the child have no effect upon the parent. Since each added form feature of the model is related exclusively to a reference coordinate, then individual features may be added, edited, suppressed or deleted individually without affecting the rest of the model.

Throughout this specification, examples and terminology will refer to Unigraphics® v-series software for illustrative purposes, but the method is not to be construed as limited to that particular software package. Other suitable CAD/CAM software packages that meet the three criteria above and that would therefore be suitable. For example, other suitable software packages include, but may not be limited to, SOLID EDGE@, also by Unigraphics®, and CATIA® by IBM®. Note that the phrases "datum planes", "parametric modeling" and "features" are phrases derived from the Unigraphics® v-series documentation and may not necessarily be used in other software packages. Therefore their functional definitions are set out below.

"Model" refers to the part that is being modeled in the CAD/CAM software. The model comprises a plurality of "features".

"Datum planes" refer to reference features that define Cartesian coordinates by which other features may be referenced to in space. In Unigraphics®, the datum planes are two-dimensional, but a plurality of datum planes may be added to a drawing to establish three-dimensional coordinates. These coordinates may be constructed relative to the model so as to move and rotate with the model. Regardless of how the coordinate system is created, for the purposes of this disclosure it should be possible to reference numerous features to the same coordinate system.

"Parametric modeling capabilities" refers to the ability to place mathematical constraints or parameters on features of the model so that the features may be edited and changed later. Models that do not have this capability are referred to as "dumb solids." Most CAD/CAM systems support parametric modeling.

"Features" refers to parts and details that combine to form the model. A "reference feature", such as a coordinate system, is an imaginary feature that is treated and manipulated like a physical feature, but does not appear in the final physical model.

"Feature modeling" is the ability to build up a model by adding and connecting a plurality of editable features. Not all CAD/CAM software supports this capability. AutoCAD®, for example, currently employs a wireframe-and-skin methodology to build models rather than feature modeling. An aspect of feature modeling is the creation of associative relationships among models, model elements, features, and the like, as well as combinations of the foregoing, meaning the features are linked such that changes to one feature may alter the others with which it is associated. An exemplary associative relationship is a "parent/child relationship".

"Parent/child relationship" is a type of associative relationship among models, model elements, features, and the like, as well as combinations of the foregoing. For example, a parent/child relationship between a first feature (parent) and a second feature (child) means that changes to the parent feature will affect the child feature (and any children of the child all the way down the familial line), but changes to the child will have no effect on the parent. Further, deletion of the parent results in deletion of all the children and progeny below it.

The present invention relates to the design and manufacture of a real-world object based upon a virtual CAD/CAM model. An inventive aspect of this method is that the model is horizontally-structured as disclosed in copending, commonly assigned, U.S. Ser. No. 09/483,722, Filed Jan. 14, 2000, the disclosures of which are incorporated by reference herein in their entirety.

An example of the method of a preferred embodiment is depicted in FIG. 1. FIG. 1 shows the progressive building up of a model through processes A through J. The actual shape of the model depicted in the figures is purely for illustrative purposes only, and is to be understood as not limiting, in any manner. In the figure, at A the creation of the first feature of the model, known as the base feature 0 is depicted.

Referring again to FIG. 1, B depicts the creation of another feature, a datum plane that will be referred to as the base-level datum plane 1. This is a reference feature as described above and acts as a first coordinate reference. The arrows 13 that flow from the creation of one feature to another indicate a parent/child relationship between the originating feature created and the feature(s) to which the arrow points. Hence, the base feature 0 is the parent of the base-level datum plane. As explained above, any change to the parent will affect the child (e.g., rotate the parent 90 degrees and the child rotates with it), and deletion of the parent results in deletion of the child. This effect ripples all the way down the family line. Since the base feature 0 is the great-ancestor of all later features in the modeling process, any change to the base feature will show up in every feature later created in the process and deletion of the base feature will delete everything. Note that since the base-level datum plane 1 is the child of the base feature 0, any change to the base-level datum plane 1 will have no effect upon the base feature, but will affect all its progeny. As a reference coordinate, the base-level datum plane is useful as a positional tool.

It is preferred that the positioning of the base-level datum plane 1 with respect to the base feature 0 be chosen so as to make the most use of the base-level datum plane 1 as a positional tool. Note that in FIG. 1, the base-level datum plane 1 is chosen to coincide with the center of the cylindrical base feature. By rotating the base-level datum plane 1 symmetrically with the center of the base feature, all progeny will rotate symmetrically about the base feature as well. Differently shaped base features will suggest differently positioned base-level datum planes. Once again, it is noted that datum planes are used here because that is the coordinate system utilized by Unigraphics® software and is therefore illustrative only. Other software or systems may use coordinate reference features that are linear or three-dimensional. It is noteworthy then to appreciate that the teachings disclosed herein are not limited to planar reference features alone and may include various other reference features.

A second coordinate reference may be created as a child of the first coordinate reference described above, though this is not strictly necessary. As seen at C of FIG. 1, a first, second, and third datum planes 2, 3, and 4 respectively are created. Each datum plane is oriented orthogonal to the others so that the entire unit comprises a three-dimensional coordinate system 6. The 3-D coordinate system thus created is a relative one, meaning it rotates and moves along with the model. This is in contrast to an absolute coordinate system that exists apart from the model and as is common to all CAD/CAM software. Unigraphics® software for example, actually includes two absolute coordinate systems, a "world" coordinate system and a more local "working level" coordinate system.

Figure 2:
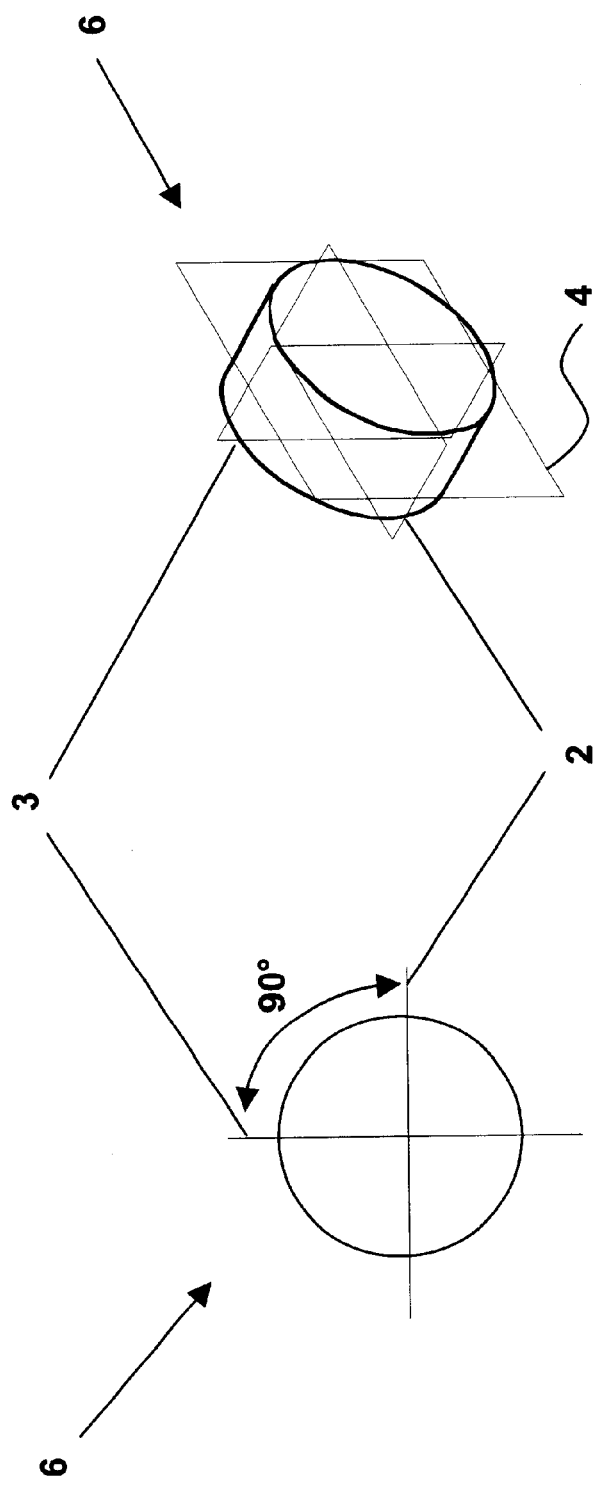
FIG. 2 is a magnified view of the relative 3-D coordinate system used in FIG. 1.

Referring to FIGS. 1 and 2, there are numerous ways and configurations possible to establish the 3-D coordinate system 6. For example, three independent datum planes, each referenced to another reference, or three datum planes relative to one another, where a datum plane may be referenced to a particular reference. A preferred method is to create a first datum plane 2 that is the child of the base-level datum plane 1 and offset 90 degrees therefrom. Then, a second datum plane 3 is created as a child of the first datum plane 2 and is offset 90 degrees therefrom. Note that the second datum plane 3 now coincides with the base-level datum plane 1, but they are not the same plane. It can be seen that any movement of the base-level datum plane 1 will result in corresponding movement of first 2 and second 3 datum planes of the 3-D coordinate system 6. The third datum plane 4 of the 3-D coordinate system 6 is created orthogonal to both the first and second datum planes 2, and 3 respectively, but is a child of the base feature 0 and will preferably coincide with a surface of the base feature. This is preferred with software that requires that physical features be mounted, or "placed", on a surface though they may be positioned relative to any number of datum planes. While not required, or explicitly enumerated, the third datum plane 4 may further include associative relationships with the first datum plane 2 and second datum plane 3, or any other reference plane. The third datum plane 4 of the 3-D coordinate system is therefore referred to as the "face plane," while the first two datum planes of the 3-D coordinate system are referred to as the "positional planes". All physical features added to the model from hereon will be "placed" to the face plane and positioned relative to the positional planes of the 3-D coordinate system. It will be understood that the abovementioned example of feature placement is illustrative only, and should not be construed as limiting. Any datum plane may operate as a "face plane" for feature placement purposes. Moreover, any feature may also be oriented relative to a reference axis, which may be relative to any reference, which may include, but not be limited to, a datum plane, reference plane, reference system, and the like, as well as combinations of the foregoing.

One advantage to using datum planes is that features may be placed upon them just as they may be placed upon any physical feature, making the 3-D coordinate systems created from them much more convenient than simple coordinate systems found on other CAD/CAM software. It should be noted, however, that these techniques apply to software that utilize datum planes such as Unigraphics® v-series. For other software, there may, and likely will be, other techniques to establishing a 3-D coordinate system relative to the model to which the physical features of the model may be positioned and oriented. Once, again, this method is not to be construed as limited to the use of datum planes or to the use of Unigraphics® software.

Continuing once again with FIGS. 1 and 2, the system now includes the first, second, and third datum planes 2, 3, and 4 respectively, which may be manipulated by the single base-level datum plane 1 so as to affect the positioning of all features added to the base feature 0, but with the constraint that the "placement" of each feature is fixed relative to a face of the base feature 0. This is but one of many possible arrangements but is preferred in the Unigraphics® environment for its flexibility. Movement of the base-level datum plane 1 results in movement of the positional datum planes e.g., the first and second datum planes 2 and 3 respectively, but need not necessarily affect the third datum plane 4. The result is that objects will move when the base-level datum plane 1 is moved, but be constrained to remain placed in the face or third datum plane 4. It is found that this characteristic allows for more convenient and detailed adjustment, though it is a preferred, rather than a mandatory characteristic of the invention.

Referring again to FIG. 1, we see the successive addition of physical features, or form features 5a through 5g, to the model at D through J. At D, a circular boss 5a is mounted to the third datum plane 4 and positioned relative to the "positional" planes e.g., the first and second datum planes 2 and 3 respectively. At each of E and F, a pad 5b, 5c is added to the model, thereby creating protrusions on either side. At G through J, individual bosses 5d, 5e, 5f, and 5g are added to the periphery of the model. Note that in each instance, the new feature is mounted to the face plane and positioned relative to the positional datum planes e.g., the first and second datum planes 2 and 3 respectively. This means that each feature 5 is the child of the third datum plane 4 and of each of the first datum plane 2, and second datum plane 3. In the embodiment shown, each feature is therefore a grandchild, great-grandchild, and great-great-grandchild of the base feature 0 by virtue of being a child of the third datum plane 4, first datum plane 2 and second datum plane 3, respectively. This means that movement or changes of the base feature results in movement and changes in all aspects of the added features, including both placement and positioning.

Each feature added to the coordinate system of the model is independent of the others. That is to say, for example, as depicted in FIG. 1, that no physical feature (except the base feature) is the parent of another. Since no physical feature is a parent, it follows that each individual physical feature may be added, edited, suppressed, or even deleted at leisure without disturbing the rest of the model. This characteristic of the disclosed embodiment that permits model development to proceed at an order of magnitude faster than traditional "vertical" CAD/CAM development. It should be further noted that while the example provided identifies features exhibiting no respective associative relationships, such a characteristic is not necessary. Features may exhibit associative relationships with other features as well as other elements of the model. The constraint this adds is the loss of independence (and hence modeling simplicity) among the several features.

Figure 3:
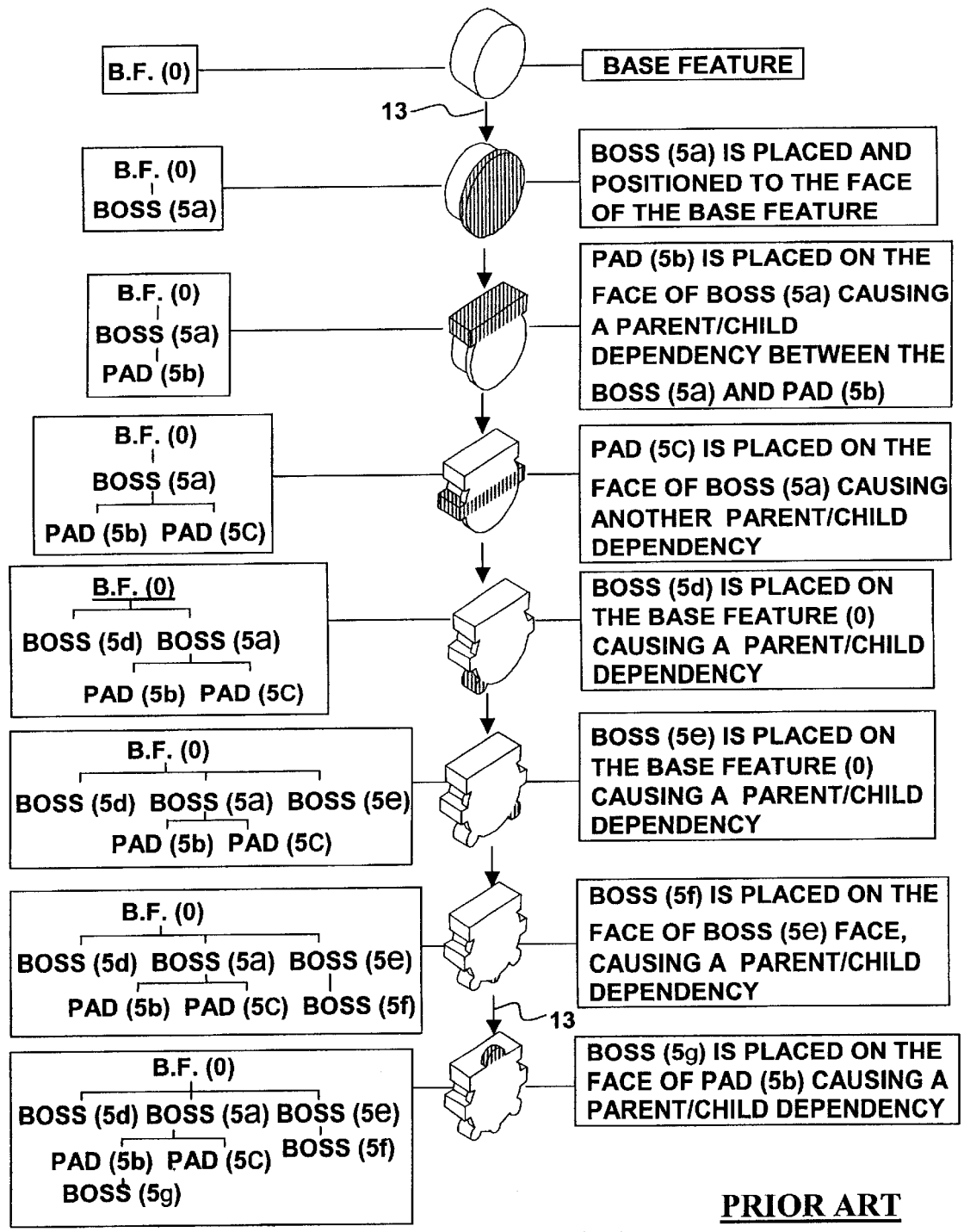
FIG. 3 is an example of the vertical modeling method.

The "vertical" methods of the prior art are graphically depicted in FIG. 3 and as taught by the Unigraphics User's Manual. The column on the right of FIG. 3 describes the process performed, the central column shows the change to the model as the result, and the leftmost column shows the changing tree structure. Note that here, since there are no datum planes utilized, there are only seven features shown as opposed to the eleven depicted in FIG. 1. It is noteworthy to observe the complex tree structure generated when features are attached to one another as depicted in FIG. 3, rather than to a central coordinate system as depicted by FIG. 1. Now, further consider what happens if the designer decides that the feature designated "Boss (5a)" (corresponding to 5 in FIG. 1) is no longer needed and decides to delete it. According to the tree structure in the lower left of FIG. 3, deletion of "Boss (5a)" results in the deletion of "Pad (5b)", "Pad (5c)" and "Boss (5g)". These features must now be added all over again. It is this duplication of effort that makes traditional "vertical" CAD/CAM design generally frustrating and time-consuming. Employment of the methods disclosed herein utilizing a similar model, suggest reductions of a factor of two in the time required for creation of a model, and time reductions of a factor of ten for making changes to a model. It should be noted that certain features may be preferably dependent from other features or model elements rather than directly dependent as children from the 3-D coordinate system as described herein. For example, an edge blend may preferably be mounted on another physical feature, not a datum plane. Such features will preferably be added to a single physical feature that itself is a child of the 3-D coordinate system, the intent being to keep the lineage as short as possible to avoid the rippling effect of a change whenever a feature is altered or deleted.

It is also noted that additional datum planes may be added as features to the 3-D coordinate system as children just like any physical feature. These would be added as needed to position other physical features, or to place them on surfaces in addition to the original first, second, and third datum planes 2, 3, and 4 respectively. Any additional datum planes needed to mount features should be at the same level as the 3-D coordinate system, that is to say a sibling of the original e.g., the first, second, and third datum planes 2, 3, and 4 respectively, not a child them. In the example shown, such an added plane would be created as a child of the base feature 0, in a similar manner as the third datum plane 4.

Figure 4:
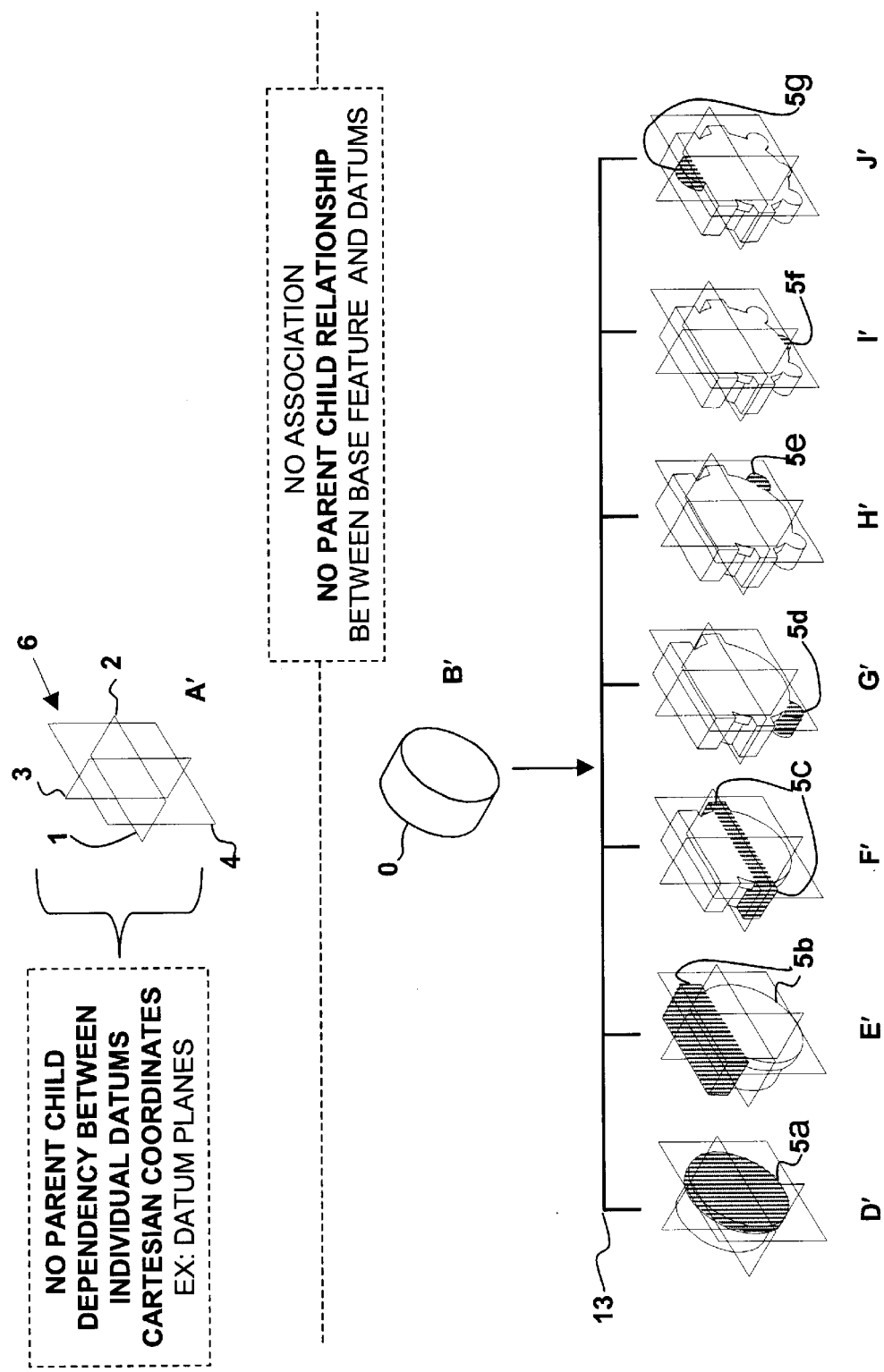
FIG. 4 is a diagram depicting an alternative embodiment of the horizontal modeling method.

An alternative embodiment of the method is depicted and exemplified in FIG. 4. FIG. 4 also shows the progressive building up of a model via process depicted at A' through J'. The actual shape of the model depicted in the figures is once again, purely for illustrative purposes, and is to be understood as not limiting, in any manner. In this embodiment, a set of coordinate references is established. As seen at A' of FIG. 4, three datum planes are created. Similar to the abovementioned embodiment, each datum plane may be oriented orthogonal to the others so that the entire unit comprises a three-dimensional coordinate system 6. Alternatively, each datum plane or 3-D coordinate system may be positioned and oriented relative to some other reference, for example and absolute reference or coordinate system. For example, the 3-D coordinate system 6 may be relative to another reference, or an absolute reference such as the reference supplied by the Unigraphics® environment. This means it may rotate and move along with a reference.

A preferred method when utilizing Unigraphics® software is to create a first datum plane 2. Then, a second datum plane 3 is created independent of the first datum plane 2 and may typically, be offset 90 degrees therefrom. The third datum plane 4 is created, and typically, but not necessarily orthogonal to both the first datum plane 2 and second datum plane 3, thereby formulating the orthogonal 3-D coordinate system 6.

It is an advantage to using datum planes that features may be placed upon them just as they may be placed upon any physical feature, making the 3-D coordinate systems created from them much more convenient than simple coordinate systems found on other CAD/CAM software. It should be noted, however, that these techniques apply to software that utilize datum planes such as Unigraphics® v-series. For other software, there may and likely will be other techniques to establishing a 3-D coordinate system relative to the model to which the physical features of the model may be positioned and oriented. Once, again, this method is not to be construed as limited to the use of datum planes or to the use of Unigraphics® software.

Another feature of this embodiment is that the relation between reference datum planes e.g., 2, 3, and 4 may, but need not be associative. Unlike earlier mentioned embodiments where a parent-child relationship was utilized, in this instance the relationship between the datum planes may be as simple as position and orientation. Once again, the teachings of this invention are not limited to planar reference features.

Turning now to FIG. 4 at B', a base feature 0 is added as a first feature, assembly or a sketch to an existing coordinate system or associative datum plane structure comprising the first, second, and third datum planes 2, 3, and 4 respectively. Where in this instance, unlike the embodiments described above, there is only a positional and orientational relationship but not necessarily an associative or parent child relationship among the first, second, and third datum planes 2, 3, and 4 respectively. The elimination of an associative relationship among the first, second, and third datum planes 2, 3, and 4, the 3-D coordinate system 6, and the base feature 0 provides significant latitude in the flexibility attributed to the 3-D coordinate system 6 and the base feature 0. Therefore, the datum plane structure comprising the first, second, and third datum planes 2, 3, and 4 respectively, may take its place as the zero'th level feature of the model. Thereafter, the base feature 0 is added at B' and the physical features, or form features 5a–5g are added at D' through J' in a manner similar to that described earlier. However, once again, it is noteworthy to appreciate that here a parent child relationship is eliminated between the base feature 0 and the physical features, or form features 5a–5g. In addition, an associative relationship, in this case a parent child relationship is created between the physical features, or form features 5a–5g and the first, second, and third datum planes 2, 3, and 4 respectively.

It may be beneficial to ensure that the positioning of the base feature 0 with respect to the first, second, and third datum planes 2, 3, and 4 respectively, be chosen so as to make the most use of the base feature 0 as an interchangeable element. Note once again from FIG. 1, in that embodiment, the base-level datum plane 1 was chosen to coincide with the center of the cylindrical base feature. By rotating the base-level datum plane 1 symmetrically with the center of the base feature, all progeny will rotate symmetrically about the base feature as well. Differently shaped base features will suggest differently positioned base-level datum planes. In this embodiment, the physical features, or form features 5a–5g and the first, second, and third datum planes 2, 3, and 4 respectively, maintain an associative relationship, but neither with the base feature 0. When the 3-D coordinate system is established before the fundamental shape is placed on the screen and presented to the user, it simplifies substitution of the base feature 0 to other models. For example, where it may be desirable to change one base feature 0 for another, and yet preserve the later added physical features, or form features e.g., 5a–5g. The disclosed embodiment simplifies this process by eliminating the parent child relationship between the base feature 0 and the datum planes. Therefore the base feature 0 may be removed and substituted with ease. Moreover, the physical features, or form features 5a–5g and the first, second, and third datum planes 2, 3, and 4 respectively may easily be adapted to other base features of other models.

Enhancement to Horizontally Structured Modeling Employing Model Link/Uplink

Another feature of the horizontally structured modeling and modeling is disclosed which utilizes the horizontal CAD/CAM modeling methods described above. Specifically, the first embodiment is further enhanced to ultimately facilitate generating horizontally structured CAD/CAM models. In an exemplary embodiment, horizontally structured modeling methods disclosed above are employed to facilitate the generation of one or more models for creating the actual part To facilitate the method disclosed and model creation, a link and unlink functionality is disclosed which provides for automatic references and the modification of associative relationships among one or more CAD/CAM models and model elements. The link/unlink function allows a newly created or existing model or model elements to be replaced by another. Moreover, the features associated with a first model may be reassociated to another model with little if any impact to the associated features.

In the Unigraphics® environment, the exemplary embodiment takes advantage of the existing link and unlink functionality of the Unigraphics® CAD/CAM system software coupled with the methods of horizontally structured CAD/CAM modeling to facilitate an enhanced method of modeling. In the exemplary embodiment, an illustration employing Unigraphics® software and references is provided. However, it should be noted that while the exemplary embodiment is described by way of illustration with and reference to Unigraphics® CAD/CAM system software it is not to be construed as limited thereto. The disclosed embodiments are equally applicable to any CAD/CAM system software, which exhibits or possesses the dictated requirements and capabilities. The disclosed method includes the removal of feature dependency between modeling elements, in this instance a form feature of model generated as disclosed earlier, and a linked geometry. Therefore, enabling the form feature or linked geometry to be replaced by a new for feature or linked geometry without losing the prior positional and orientational dependencies associated with the form feature or linked geometry. Therefore, this capability maintains the associative relationships generated between a linked geometry and a model element.

Figure 5:
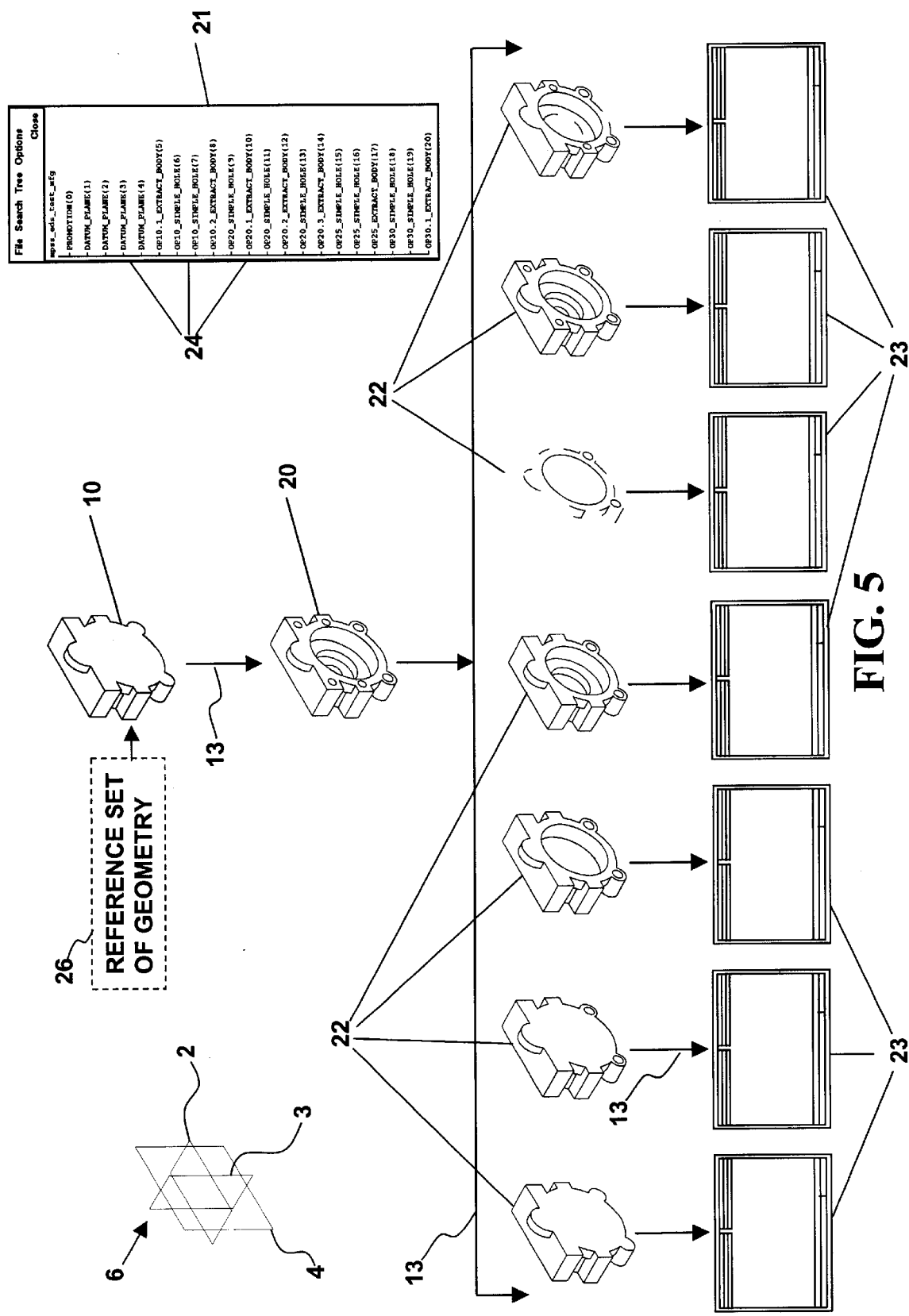
FIG. 5 depicts the virtual machining process.

Referring to FIGS. 1 and 5, for a better understanding of the features of the disclosed embodiment, reference is made to the earlier disclosed enhanced modeling embodiment, as well as exemplified below. Therefore, the disclosure will be in reference to horizontally-structured product modeling but is not to be construed as limited thereto. In reference to the modeling, once again, a suitable base feature 0 may be selected for developing a 3-D parametric solid model with the horizontally structured modeling method.

FIG. 1 once again, shows the progressive building up of a model via process depicted at A' through J'. The actual shape of the model depicted in the figures is once again, purely for illustrative purposes, and is to be understood as not limiting, in any manner. Once again, in this embodiment, a set of coordinate references is established. These coordinate references including datum planes and axes exhibit the same characteristics, properties and relationships as described in the above mentioned embodiments and therefore will not be repeated here. Moreover, the relationships among the modeling elements are similar and need not be reiterated to illustrate the application of the exemplary embodiment.

Turning now to FIG. 4 and once again to the build up of the model in an exemplary embodiment. Once again at B', a base feature 0 is added as a first feature, assembly or a sketch to an existing coordinate system or associative datum plane structure comprising the first, second, and third datum planes 2, 3, and 4 respectively. Where in this instance, there is only a positional and orientational relationship but not necessarily an associative or parent child relationship among the first, second, and third datum planes 2, 3, and 4 respectively. The elimination of an associative relationship among the first, second, and third datum planes 2, 3, and 4 respectively, the 3-D coordinate system 6, and the base feature 0 provides significant latitude in the flexibility attributed to the 3-D coordinate system 6 and the base feature 0. Therefore, the datum plane structure comprising the first, second, and third datum planes 2, 3, and 4 respectively, may take its place as the zero'th level feature of the model. Thereafter, the base feature 0 is added at B' and the physical features, or form features 5a–5g are added at D' through J' in a manner similar to that described earlier. However, once again, it is noteworthy to appreciate that here a parent child relationship is eliminated between the base feature 0 and the physical features, or form features 5a–5g. In addition, an associative relationship, in this case a parent child relationship is created between the physical features, or form features 5a–5g and the first, second, and third datum planes 2, 3, and 4 respectively.

In an illustration of the exemplary embodiment the model including the base feature 0, the first, second, and third datum planes 2, 3, and 4 respectively of the coordinate system 6, as well as the form features 5a–5g may be manipulated utilizing the link/unlink function to develop a model or modify and existing model. In an example which exemplifies the features of the horizontally structured modeling would be to unlink one or more of the first, second, and third datum planes 2, 3, or 4 respectively with respect to the form features 5a–5g, thereby eliminating the associative relationships, thereafter, substituting a new or different datum planes and re-linking the form features 5a–5g to establish the associative relationships with the new datum planes. Such a capability makes extraordinary use of the datum planes or form features as interchangeable model elements. Note also, the converse is also possible where additional form features may be interchangeably utilized with a particular datum planes e.g., 2, 3, and 4.

In yet another illustration of the exemplary embodiment, a model element such a form feature 5b for instance may be linked to another form feature or a form feature of another model in such a manner that when a change is implemented which modifies the first form feature in this instance 5b, the second is automatically modified.

In this embodiment, once again, the physical features, or form features 5a–5g and the first, second, and third datum planes 2, 3, and 4 respectively, maintain an associative relationship, but neither with the base feature 0. When the 3-D coordinate system is established before the fundamental shape is placed on the screen and presented to the user, it simplifies substitution of the base feature 0 to other models. For example, where it may be desirable to change one base feature 0 for another, and yet preserve the later added physical features, or form features e.g., 5a–5g. The disclosed embodiment simplifies this process by eliminating the parent child relationship between the base feature 0 and the datum planes. Therefore the base feature 0 may be removed and substituted with ease. Moreover, the physical features, or form features 5a–5g and the first, second, and third datum planes 2, 3, and 4 respectively, may easily be adapted to other base features of other models.

The described independence of the modeling and model element described above provides significant flexibility in the modeling process by allowing a user to interchangeably apply various features to a particular model. Likewise, interchangeable models may be generated without impacting the particular features or datum planes (e.g., 2, 3, and 4) utilized. For example, different base features 0 may be selected and a new model generated therefrom and subsequently, the same features and associated datums added. Moreover, links may be established between model elements to establish associative relationships such that when a change is made to a first model element, the change is automatically reflected in the linked element. Referring once again to FIGS. 1 and 4, the modeling process of the exemplary embodiment where form features are added to the base feature 0 is depicted. The process is similar to that disclosed above and therefore, need not be repeated.

Once again, one may recognize the model as the completed horizontally structured model depicted at J' in FIG. 4 including all of the form features 5a–5g. Once again, some CAD/CAM software packages may require that the addition of the form features(s) 5a–5g to be in a particular order. Once again, in such a case, a method for reordering the features may prove beneficial.

It is noteworthy to appreciate that the link/unlink capability realizes its potential and significance primarily due to the characteristics of the horizontally structured model and disclosed herein. Specifically, the separation/distribution of associative relationships in the models provides the enhanced flexibility and ease of model generation and modification achieved.

In contrast, in "vertical" modeling as depicted in FIG. 3, where the traditional approach to modeling was to create separate features in series. If a change or deletion was made in one model, it was necessary to individually update the entire model with all the subsequent features. Using the horizontally structured modeling disclosed herein and employing the model link/unlink capabilities, it is now possible to generate multiple horizontally structured models linked in a manner such that changes in one model are automatically carried out in other linked models.

Horizontally Structured Manufacturing Process Modeling

A manufacturing process is disclosed which utilizes the horizontal CAD/CAM modeling methods described above to ultimately generate process instructions and documentation used to control automated machinery to create a real-world part based on a horizontally-structured model. In a preferred method, a manufacturing process model is generated process model "extracts" are used to generate process sheets or other instructions for each procedure to machine the real-world part.

Referring to FIG. 5, to initiate the manufacturing process and virtual machining, once again, a suitable blank may be selected or created, for example, a cast piece, the dimensions and measurements of which, are used as the virtual blank 10 for the virtual machining of the 3-D parametric solid model with the horizontally structured manufacturing method. Alternatively, a virtual blank 10 may be selected, and a blank could be manufactured to match it. This alternative may prove be less desirable as it would incorporate additional machining which would not be necessary if the virtual blank 10 initiates with the blank's dimensions. It is nonetheless stated to note that the method disclosed includes, and is not limited to a variety of approaches for establishing the blank and a representative virtual blank 10 for the model.

For example, in the Unigraphics® environment, a suitable blank or component is selected. A virtual blank 10 is generated therefrom, commonly a referenced set of geometries from a model termed a reference set 26 shown in FIG. 8 (e.g., a built up product model of a part). From this referenced set of geometries a three-dimensional virtual blank 10 model may be generated or created for example via the Wave link or Promotion process of Unigraphics®, which includes all of the modeled details of the completed part.

Once a virtual blank 10 has been established that corresponds to a real-world blank, a horizontally-structured 3-D parametric solid model is generated or created in a manner that describes machining operations to be performed on the blank so as to produce the final real-world part. This horizontally structured model will be referred to as the master process model 20. It is noteworthy to appreciate that the master process model 20 depicted includes with it, but is not limited to, the virtual blank 10, added manufacturing features 12*a*–12*j* by way of virtual machining, and the first, second, and third datum planes 2, 3, and 4 respectively, all in their respective associative relationships as exhibited from the geometries and characteristics of the reference set 26.

The master process model 20, logically, is a child of the reference set 26 and virtual blank 10, thereby ensuring that if a design change is implemented in the product model utilized for the reference set 26, such a change flows through to the master process model 20 and manufacturing process. Unique to this embodiment, is the lack of a mandatory associative relationship among the master process model 20 and the first, second, and third datum planes 2, 3, and 4 respectively, which comprise the reference 3-D coordinate system 6 with respect to which, the form features and manufacturing features are positioned and oriented. Moreover, also unique to this embodiment, is the absence of a mandatory associative relationship among the first, second, and third datum planes 2, 3, and 4 respectively, themselves. This independence, as with the modeling described above provides significant flexibility in the manufacturing process by allowing a user to interchangeably apply various features to a master process model. Likewise, interchangeable master process models may be generated without impacting the particular features or datum planes utilized.

Figure 6:
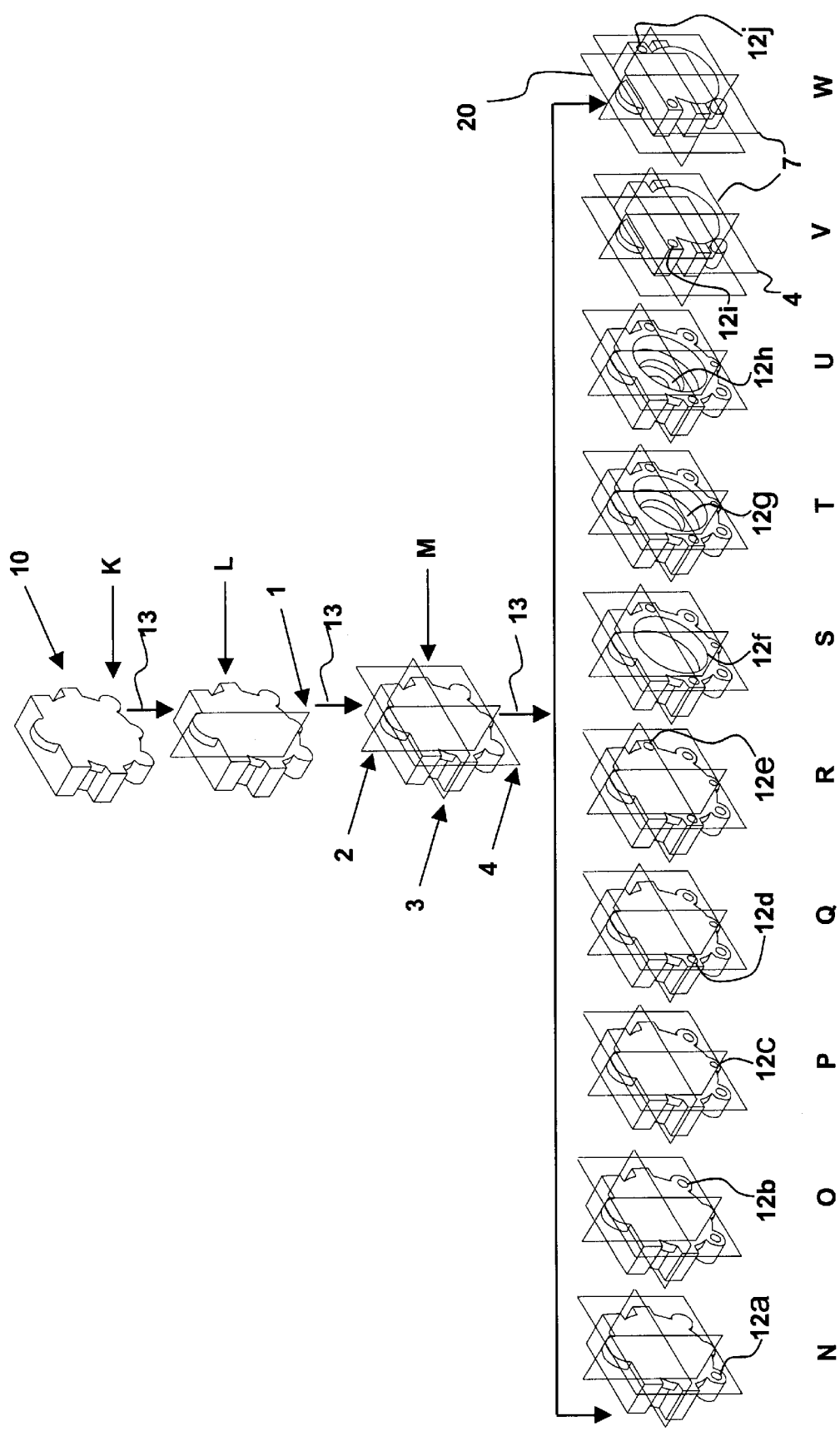
FIG. 6 depicts the virtual machining process and the addition of manufacturing features.

Referring to FIG. 6, the virtual machining process of the exemplary embodiment where manufacturing features are "machined" into the virtual blank 10 is depicted. For example, at N, O, and P various holes are "drilled" into the virtual blank 10 as manufacturing features 12*a*, 12*b*, and 12*c* respectively. Moreover, at S a large hole is created via boring operation at 12*f*. It is also noted once again, just as in the horizontally structured modeling methods discussed above, that the first, second, and third datum planes 2, 3, and 4 respectively, may be added as features to the 3-D coordinate system as children just like any form feature (e.g., 5*a*–5*g*) or manufacturing feature 12*a*–12*j*. These may be added as needed to position other features, or to place them on surfaces in addition to the first, second, and third datum planes 2, 3, and 4 respectively. For example as shown in FIG. 6 at V, such an added plane may be created as a child of the virtual blank 10 just as the third datum plane 4 is. Moreover, at V the model has been flipped around and a face plane 7 is placed on the back as a child of the virtual blank 10. This allows manufacturing features 12*i* and 12*j* to be placed on the back of the object, in this case "counter-bores" for the holes "drilled" through the front earlier.

Figure 7:
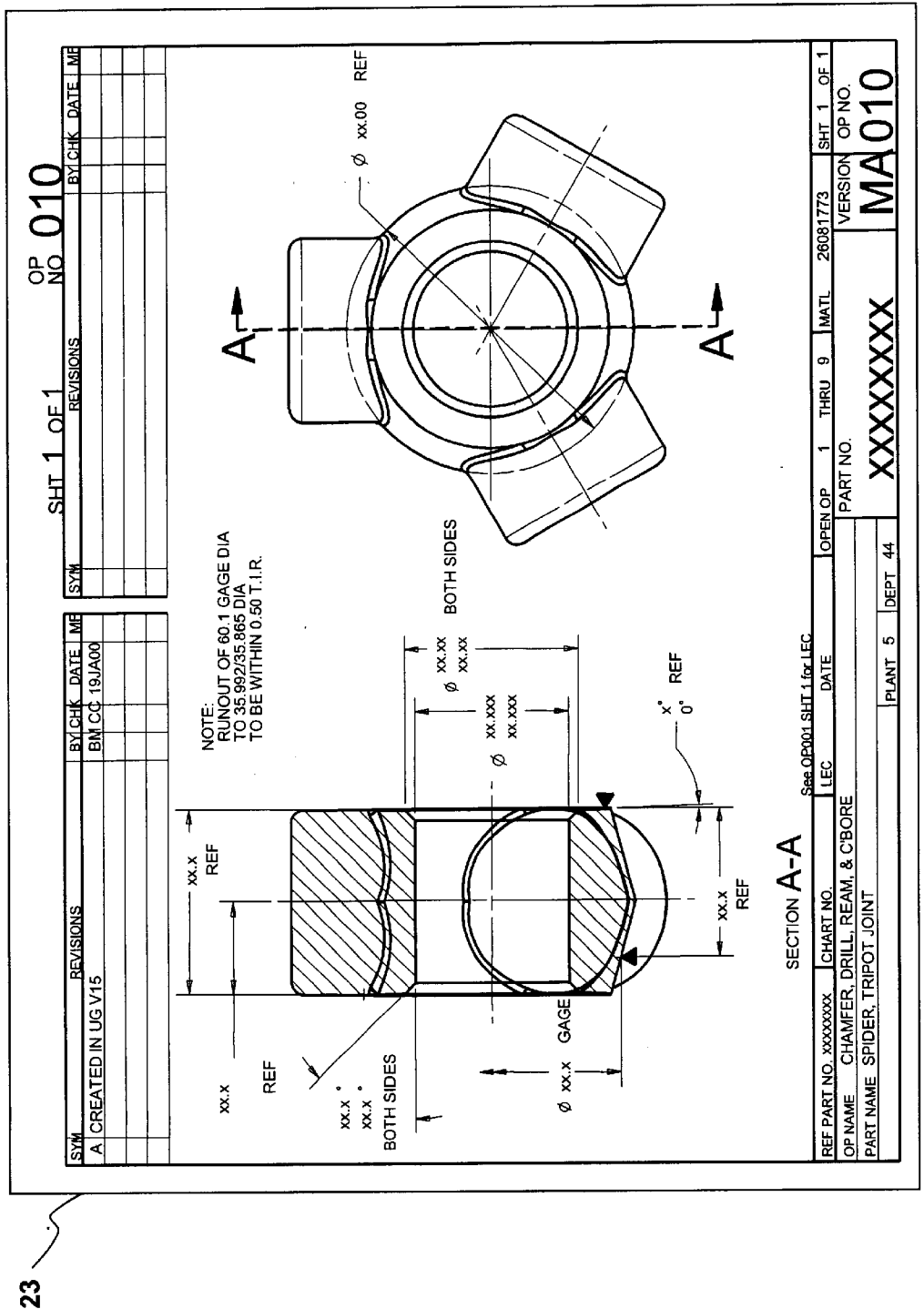
FIG. 7 depicts an exemplary process sheet.

Once again, one may recognize the master process model 20 as the completed horizontally structured model depicted at W in FIG. 6 including all of the "machining" operations. Referring again to FIG. 5, similar to the horizontally structured modeling disclosure above, some CAD/CAM software packages may require that the addition of the manufacturing features 12*a*–12*j* to be in a particular order, for example, in the same order as manufacture. In such a case, a method for reordering the features may prove beneficial. In this case, the reordering method is a displayed list of features 24 that the user may manipulate, the order of features in the list corresponding to that in the master process model 20. Here again, as stated earlier, process instructions and documentation termed process sheets 23 are then generated from each operation. The process sheets 23 are used to depict real-time in-process geometry representing a part being machined and can be read by machine operators to instruct them to precisely machine the part. Once again, an example of a Unigraphics® process sheet 23 is shown in FIG. 7. The geometry can then be used to direct downstream applications, such as cutter paths for Computer Numerical Code (CNC) machines. In a preferred embodiment, the software is adapted to generate such CNC code directly and thereby control the machining process with minimal human intervention, or even without human intervention at all.

The traditional approach to manufacturing modeling was to create individual models representing the real-world component at particular operation in the manufacturing process. If a change or deletion was made in one model, it was necessary to individually update each of the other models having the same part. Using the horizontally structured modeling disclosed herein, it is now possible to generate a horizontally structured master process model 20 and generate a set of process sheets 23 that are linked thereto. Any changes to the master process model 20 are reflected in all the process sheets 23.

Figure 8:
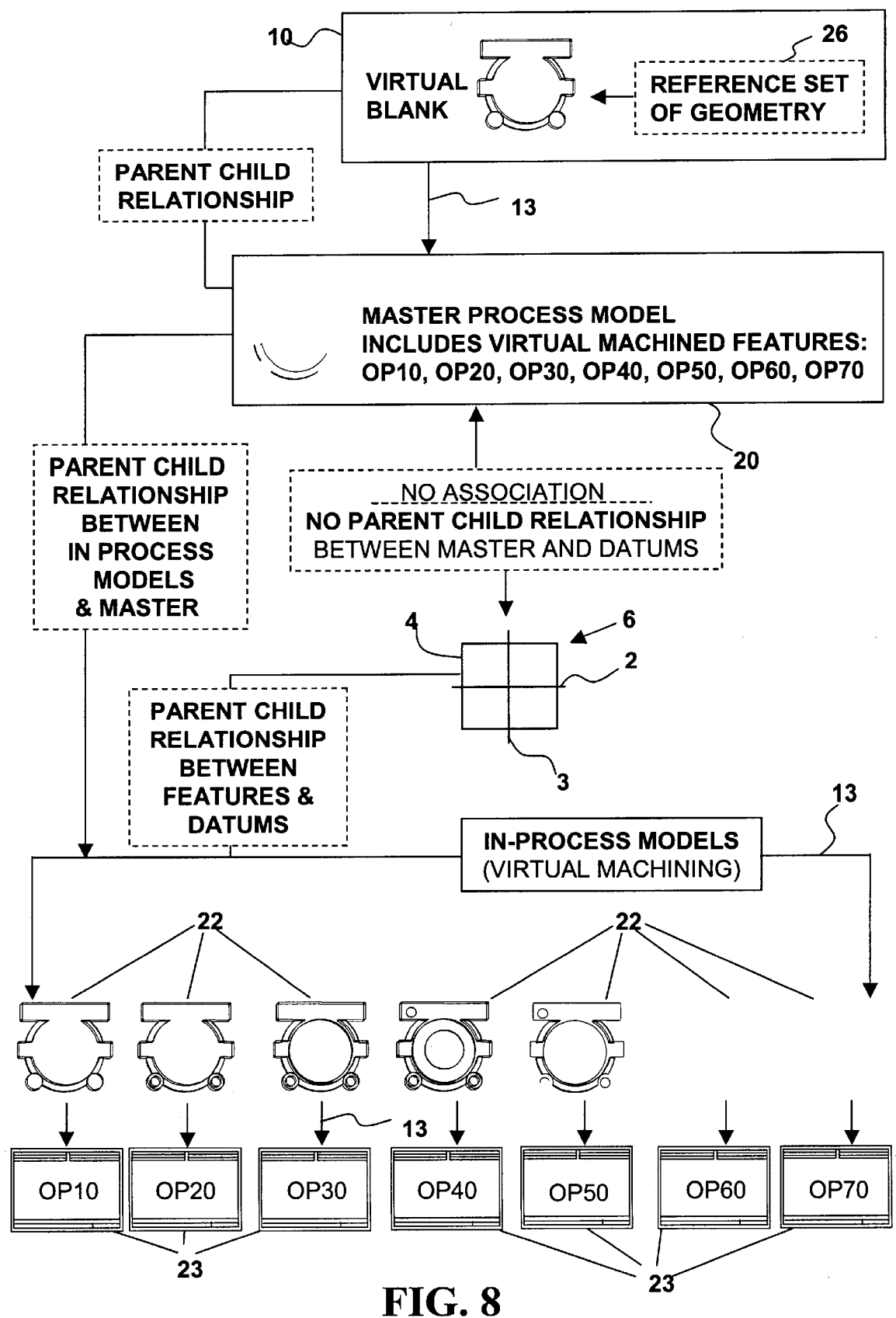
FIG. 8 depicts the enhanced manufacturing process modeling and various relationships among modeling elements.

As seen in FIG. 5, in Unigraphics® software, this linkage between the master process model 20 and the process sheets 23 is preferably achieved through the use of extracted in-process models, called virtual extract(s) or extracted bodies, hereinafter denoted extract(s) 22, that are time stamped and linked to the master process model 20. Referring also to FIG. 8, each extract 22 is also a three dimensional solid model and represents the part under fabrication at a particular operation or time in the manufacturing process. Each extract 22 is a child of the master process model 20. Any changes to the master process model 20 are automatically reflected in all the relevant extract(s) 22, but changes to the extract(s) 22 have no effect on the master process model 20. It should be noted that in an exemplary embodiment, each extract 22 need not necessarily exhibit an associative relationship with the first, second, and third datum planes 2, 3, and 4 respectively, nor the manufacturing features 12a–12j respectively. An advantage of the disclosed embodiment then is, in the realization that any changes to the first, second, and third datum planes 2, 3, and 4 respectively, as well as the manufacturing features 12a–12j are independent of the relevant extract(s) 22 and vice versa. An additional characteristic of the exemplary embodiment is that each of the manufacturing features 12a–12j, now maintain associative relationships, in this case, parent/child relationships with the corresponding first, second, and third datum planes 2, 3, and 4 respectively. Therefore, changes to the datum planes are automatically reflected in all the relevant manufacturing features 12a–12j, but changes to the manufacturing features 12a–12j have no effect on the various datum planes. Once again, the manufacturing features 12a–12j may, but need not necessarily, exhibit an associative relationship among themselves. This separation of the associative relationships of master process model 20 and extracts 22 from the first, second, and third datum planes 2, 3, and 4 respectively and manufacturing features 12a–12j is one characteristic, which enables a user now to effectively manipulate the various elements of the manufacturing process models to facilitate easy substitutions into or out of a model.

Continuing with FIG. 5, each extract 22 is a three-dimensional "snapshot" of the master process model 20 at a moment in "time" of its creation in the manufacturing process. The extracts 22 created for each operation are children of the master process model 20. By changing the master process model 20, the extracts 22, and therefore, the manufacturing process is automatically updated.

To facilitate the method disclosed and model creation, a link and unlink functionality is disclosed which provides for automatic references and the modification of links associative relationships among one or more CAD/CAM models and model elements. The part link/unlink functionality is also applied to the horizontally structured manufacturing process method disclosed to facilitate the generation, modification, and maintenance of manufacturing process models. Similar to the abovementioned disclosure, part link/unlink enable a user to modify the various relationships between modeling elements. More specifically, for example, the link/unlink function allows a newly created or existing model or model element to be replaced by another. Moreover, the features associated with a first model may be reassociated to another model with little if any impact to the associated features.

Figure 9:
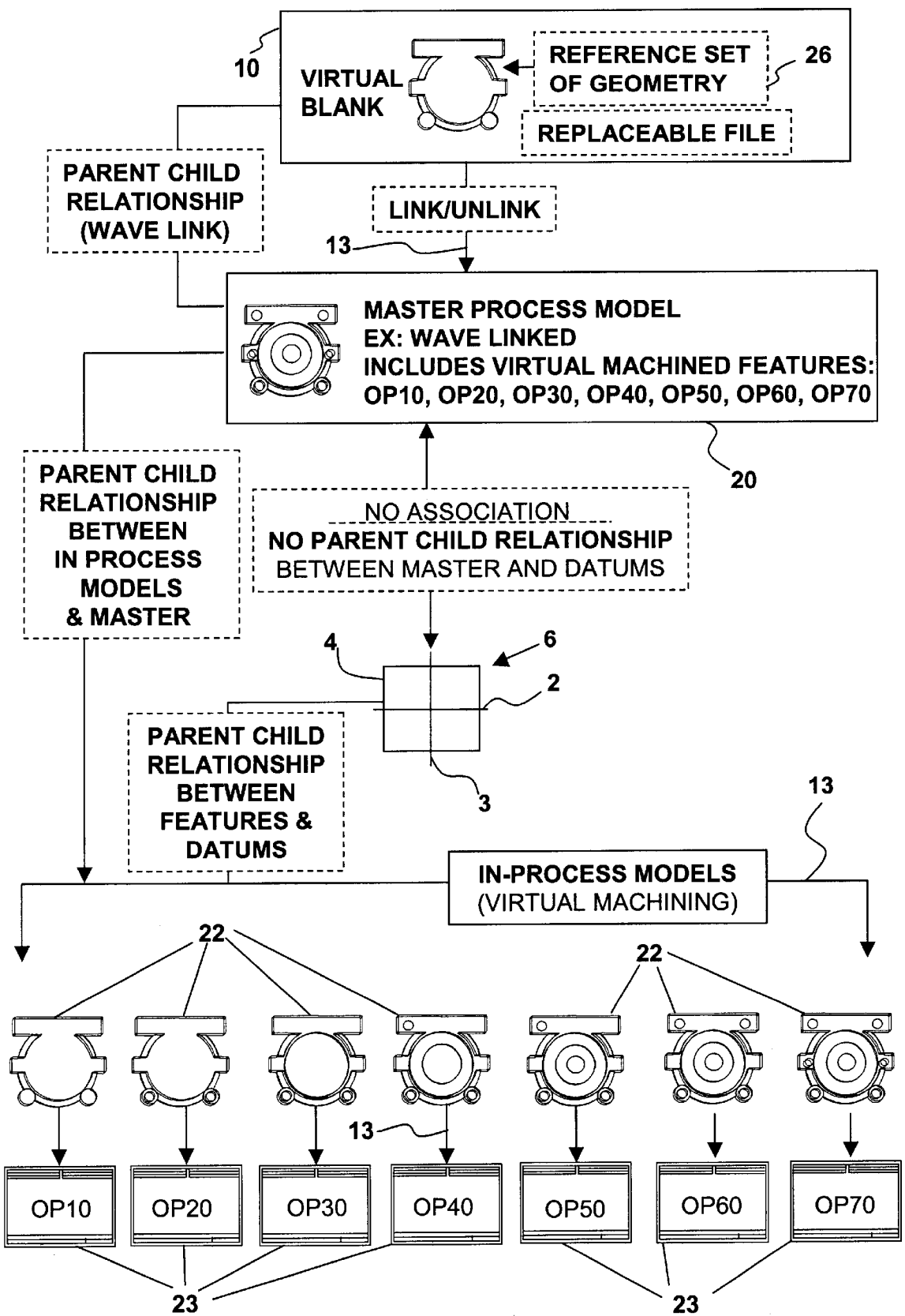
FIG. 9 depicts the manufacturing process and the application of part link/unlink functionality.

In the Unigraphics® environment, the exemplary embodiment takes advantage of the existing link and unlink functionality of the Unigraphics® CAD/CAM system software. The disclosed method includes the removal of feature dependency between modeling elements, for example, a master process model generated as disclosed earlier, and a linked geometry or other model element. Therefore, enabling the linked geometry to be replaced by a new geometry without losing the prior positional and orientational dependencies associated with the linked geometry. Therefore, this capability maintains the associative relationships generated between a linked geometry and a master process model. FIG. 9, provides an overview of the part link/unlink functionality as applied in the context of a manufacturing process.

Returning to FIG. 5 and the generation of the extracts 22. The order of creation of the extracts 22 is preferably dictated by a user-friendly graphical interface, hereinafter referred to as a model navigation tool 21. The model navigation tool 21 will preferably allow the user to arrange the order of features through simple mouse operations so as to make manipulation of the master process model 20 as simple and intuitive as practicable. In the Unigraphics® software, a model navigation tool provides similar functionality and capability. A process sheet 23 is generated for each extract 22. In the example depicted in FIG. 5, a process sheet 23 is generated for each extract in one-to-one correspondence. Since the master process model 20 is preferably created using the horizontally-structured methods described above, editing the master process model 20 is a simple and expedited matter of adding, editing, suppressing, or deleting individual features of the master process model 20, which, through the extract(s) 22, will automatically update all the process sheet(s) 23.

Further, this principle may be extended further downstream in the manufacturing process model by utilizing the electronic data for CNC programs, tooling (i.e., cutting tool selection), and fixture design by direct transmission to the machining tools without the need for process sheets 23 and human intervention. For example, in the Unigraphics® environment, such automation may be achieved by creating a reference set (analogous to the reference set 26) to the particular extract 22 and including it in a new file via virtual assembly, similar to the method employed for the creation of the virtual blank 10 discussed earlier. The extract 22 therefore, is used to create the corresponding geometry. Software must then be provided to adapt the CAD/CAM software to translate the geometry into CNC form.

The method of generating process sheets 23 initiates with selection a virtual blank 10 and then proceeding to add manufacturing features 12a–12j (FIG. 6) to the virtual blank 10 in a horizontally-structured manner as described earlier. Following each virtual machining operation, an extract 22 is made representing the state of the master process model 20 at that instant of the manufacturing process. The order in which the features are to be machined into the real-world part is decided upon either through automated means or manually by the user with the model navigation tool 21. In the Unigraphics® environment an "extract" is then preferably made of the master process model 20 corresponding to each added feature representing a manufacturing position or operation. The "extraction" is accomplished through a software module provided with the CAD/CAM software, otherwise the user may develop software to program the process. In Unigraphics® software, the Modeling Module includes software to handle the extraction process. Once again, the process sheets 23 may then be created from the extracts 22 that are added into the Drafting Module of the Unigraphics® software.

Once again, one may think of an extract 22 as a "snapshot" of the assembly of the master process model 20 in progress, showing all of the manufacturing features (e.g. one or more of 12a–12j (FIG. 6)) up to that point in the assembly, but none that come after it. The process sheet 23 derived from the extract 22 contains the instructions to machine the latest feature that appears at that "snapshot" in time. In the Unigraphics® environment, an extract 22 is an associative replica of master process model 20 depicting only those features, which have been added to that point in the manufacturing process. It is noteworthy to appreciate that, manufacturing features 12a–12j may be added to the extract 22 without appearing in the master process model 20, however any features added to the master process model 20 will appear in the extract 22 if the feature is directed to be added at or before the manufacturing procedure represented by the extract 22.

Referring to FIG. 5, there is shown a typical process sheet 23. Once again, a process sheet 23 is a document defining the sequence of operations, process dimensions, and listing of equipment, tools, and gauges required to perform an operation. Manufacturing personnel utilize process sheets to obtain the detailed information required to manufacture and inspect the components depicted thereon. Each process sheet 23 includes, but is not limited to, both graphics and text. Again, the graphics may include, but not be limited to, the dimensional characteristics of the part for the particular portion of the manufacturing process, the text may include, but not be limited to various data identifying the part and operation and noting revisions, and corresponding tooling fixtures and gauges, and the like. Once again, an example is shown in FIG. 7, with the same characteristics as described earlier.

Virtual Concurrent Product and Process Design

Product and process modeling traditionally, involves the creation of two models, one to represent the finished component and another to represent the manufacturing processes. The two models generally include no feature linkages, particularly in the final product model and therefore, the models have to be manually updated to reflect any changes to the manufacturing process or the finished component. Moreover, certain operations may need to be repeated for both the product model and the manufacturing process modeling. Maintaining two models and manually updating models is cumbersome and expensive.

The model link/unlink functionality coupled with the horizontally structured modeling as disclosed earlier brings forth new opportunities for enhancement of CAD/CAM modeling and manufacturing process modeling. One such opportunity is horizontally structured CAD/CAM modeling and manufacturing process modeling methods to facilitate concurrent product and process design. An exemplary embodiment addresses the deficiencies of known manufacturing modeling methods by creating a single master model to represent the finished component or product and the manufacturing process for the product.

For a better understanding of the features of the disclosed embodiment, reference is made to the earlier disclosed horizontally structured modeling as well as to horizontally structured manufacturing process modeling including model link/unlink disclosed below as well as, further exemplified below. The exemplary embodiment is described by illustration of additional features subsequent to the abovementioned embodiments, specifically an enhancement to the horizontally structured manufacturing process modeling disclosed and claimed herein. Therefore, the disclosure will be in reference to and illustrated using manufacturing process modeling as an example but is not to be construed as limited thereto.

In the disclosed method, horizontally structured modeling methods as disclosed above are employed to facilitate the generation of a product design and manufacturing process model for creating an actual part. The exemplary embodiment comprises a model termed master product and process concurrent model analogous to those described above, but including both the product design model and the manufacturing process model. In this instance, the master product and process concurrent model includes associative relationships (e.g. links) configured such that changes in master product and process model are reflected in all the subsequent linked in process models or extracts and subsequently process sheets. Similar to the above-mentioned embodiments, "extracts" of the master product and process concurrent model are utilized to generate process sheets or other instructions for each procedure to machine a real-world part.

Figure 10:
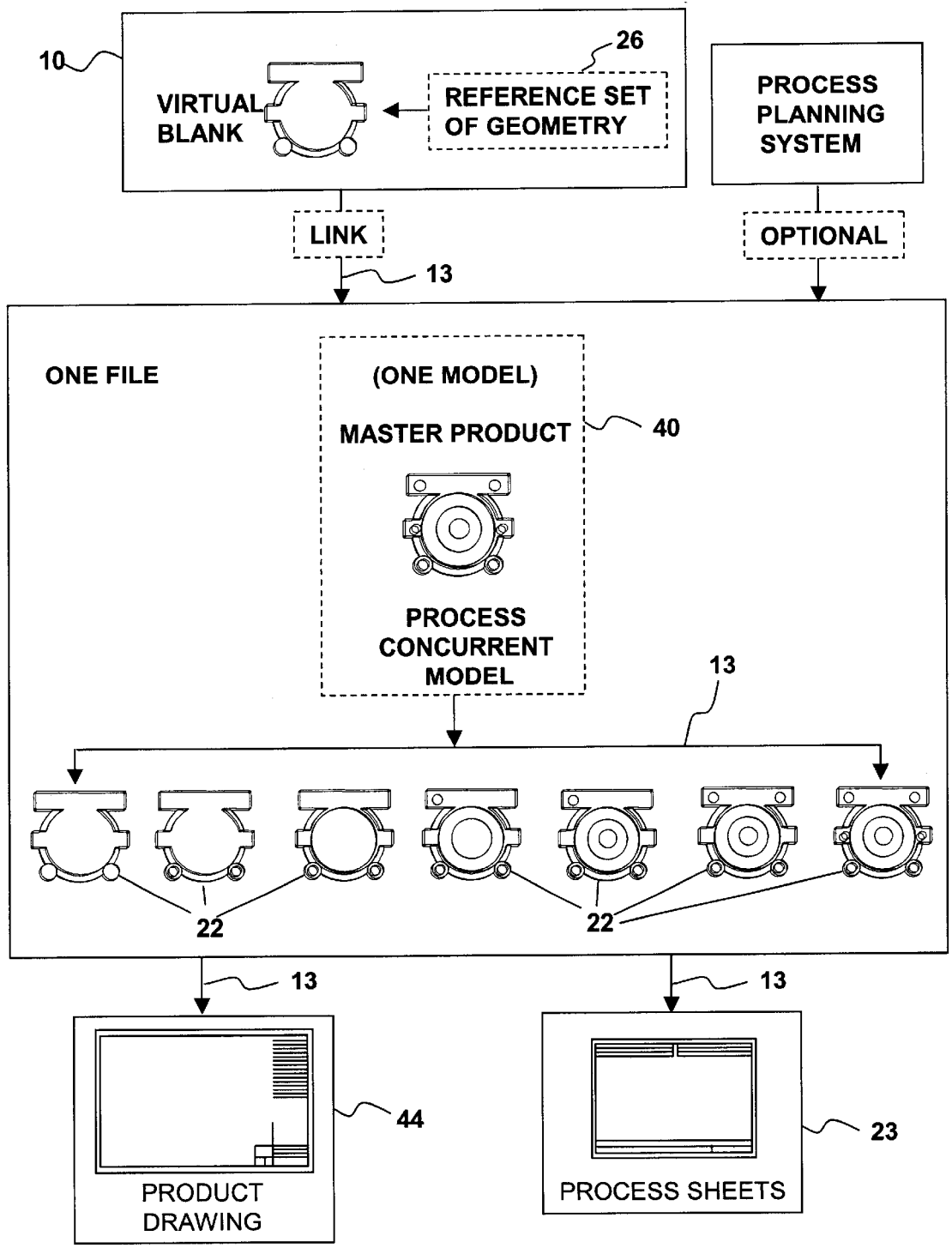
FIG. 10 depicts concurrent product and manufacturing process design modeling.

Referring now to FIG. 10, to facilitate the disclosed embodiment, the link/unlink and extraction functions disclosed above may once again be employed. Moreover, to facilitate the disclosure reference should be made to FIGS. 5 and 6. To execute generating a combined product and manufacturing process model, once again in the same manner as described in the embodiments above, is a 3-D parametric solid model representative of the geometry of a reference set 26 is created. The new model termed the master product and process concurrent model 40 includes, but is not limited to the combined elements, characteristics, and relationships of a virtual blank 10, the first, second, and third datum planes 2, 3, and 4 respectively, as in the horizontally structured modeling embodiment as well as a master process model 20 as described in the horizontally structured manufacturing process modeling embodiments above. Moreover, the relationships, including, but not limited to, positional, orientational, associative, and the like, as well as combination of the foregoing among the model elements are also acquired and retained. To avoid duplication, reference may be made to the abovementioned embodiments for insight concerning a master process model and horizontally structured models.

Therefore, now the master product and process concurrent model 40 may be manipulated and modified as required to model the creation as well as the method of manufacturing the actual part. Once again, this master product and process concurrent model 40, logically, is a child of the reference set 26 and virtual blank 10. Moreover, once again, no mandatory associative relationship need exist among the master product and process concurrent model 40 and the first, second, and third datum planes 2, 3, and 4 respectively, which comprise the reference 3-D coordinate system 6 with respect to which, the manufacturing features 12a–12j (FIG. 6) are positioned and oriented.

The described independence, as with the modeling described above provides significant flexibility in the product design modeling and manufacturing process modeling by allowing a user to interchangeably apply various features to a particular master product and process concurrent model 40. Likewise, interchangeable master product and process concurrent models 40 may be generated without impacting the particular manufacturing features 12a–12j or datum planes (e.g., 2, 3, and 4) utilized. For example, different reference sets 26 may be selected and a new master product and process concurrent model 40 generated therefrom and subsequently, the same manufacturing features 12a–12j and associated datum planes (e.g., 2, 3, and 4) added.

Turning now to FIG. 14 once again for insight into the utilization of a reference set 26, the virtual blank 10, the master product and process concurrent model 40 with associated relationships and progeny are applied to facilitate a product design and manufacturing process. In an exemplary embodiment product models, as disclosed in the abovementioned embodiments may be generated, ultimately resulting in a product drawing 44 depicting the design of the product. The product drawing including the information required to define the part, including, but not limited to, materials, characteristics, dimensions, requirements for the designed part or product, and the like, as well as combinations of the foregoing. In addition, from the master product and process concurrent model 40 one or more in-process models or extract(s) may be generated. From the extract(s) 22 associated with the master product and process concurrent model 40, corresponding process sheets 23 may thereafter be generated. Where again, extracts, of the master product and process concurrent model 40 are created at various operations of the manufacturing processes associated with a master product and process concurrent model 40. Once again from these extracts 22, corresponding process sheets 23 may be generated for specifying the manufacturing operations. Once again it should be recognized that the extracts 22 and process sheets 23 are created and include the characteristics, relationships and limitations as described above for horizontally structured models and horizontally structured process models. To avoid duplication, reference may be made to the abovementioned embodiments for insight concerning in process models or extracts and process sheets.

In yet another exemplary embodiment of the concurrent product and process design modeling, the master product and process concurrent model 40 disclosed above may further be linked with a manufacturing process planning system. For example, the process planning system may be utilized to define the manufacturing in-process feature and manufacturing process parameters (e.g., machining speeds, material feed speeds, and the like, as well as combinations of the foregoing) based upon the finished product requirements. The process planning system may be developed within the CAD/CAM environment (e.g., Unigraphics® environment) or developed independently and linked with to the CAD/CAM system.

A process planning system is computer program to automate creation of manufacturing process plans based on existing manufacturing process knowledge, a rules database, and the like, including combinations of the foregoing. A process plan defines the sequence of operations and process parameters for manufacturing the component to meet the desired product geometry and quality requirements.

Preferably, the link between the process planning system and the master process concurrent model 40 may be achieved at the manufacturing feature (e.g. 12a–12j) level. Thereby creating associative relationships among model elements and a process planning system and facilitating the planning process. For example, routines can be developed within the CAD/CAM system and the process planning system to share geometry and process data associated with the manufacturing features (e.g., 12a–12j). For example, process data may include, but not be limited to machining speeds, feeds, tooling, tolerances, manufacturing cost estimates, etc. Additionally, routines may be developed within a CAD/CAM system to enable creation and management of features within the master product and process concurrent model 40. The routines may thereafter be called by the process planning system to create and sequence manufacturing in-process features. Integration of a process planning system with the master product and process concurrent model 40 in such manner will enable rapid creation of process plans concurrent with the product designs.

It is noteworthy to appreciate that the concurrent product and process design modeling capability disclosed realizes its potential and significance primarily due to the characteristics of the horizontally structured modeling and manufacturing processes disclosed herein. Specifically, the separation/distribution of associative relationships in the models provides the enhancement achieved. In contrast, in "vertical" modeling and manufacturing processes, where the traditional approach to manufacturing modeling was to create separate models for product design and manufacturing process. If a change or deletion was made in one model, it was necessary to manually update the other model having the same part. Using the horizontally structured modeling disclosed herein and employing the model link/unlink capabilities, it is now possible to generate concurrent horizontally structured master product and process concurrent model linked in a manner such that changes are automatically carried out in both the product design and manufacturing models enabling significantly enhanced design and manufacturing processes. Further, the subsequent process sheets 23 that are linked thereto are also automatically updated. Any changes to a master product and process concurrent model 40 are automatically reflected in the corresponding extracts 22 and process sheets 23. Moreover, another aspect of the disclosed embodiment is the potential for integration of process planning and product/process design. Finally, the concurrent product and process design methods disclosed herein facilitate the utilization of a single file for both product and process design.

Virtual Fixture Tooling Process

Manufacturing tool and fixture drawings are often created and maintained as two-dimensional. This practice results in the manual editing of drawings. Moreover, such practice foregoes the generation of a three dimensional parametric solid model, which facilitates down stream applications. Significantly, manual editing eventually produces drawings, which may not be true to size. More damaging, is that many operators may avoid investing the time to incorporate the exact dimensional changes made to a part in the drawings, especially on two dimensional, tool, and fixture drawings.

The model link/unlink functionality coupled with the horizontally structured modeling as disclosed earlier brings forth new opportunities for enhancement of CAD/CAM modeling and manufacturing process modeling. One such opportunity is horizontally structured CAD/CAM modeling and manufacturing process modeling methods to facilitate virtual fixture and tooling product and process design. An exemplary embodiment addresses the deficiencies of known tooling and fixture design and modeling methods by creating linkages to a model, for example a casting model, and to the required in-process models for the finished component or product and the manufacturing process for the product.

A method is disclosed which automates the process of generating and editing contact tooling and fixture drawings. This new process creates a 3-D parametric solid model of contact tools and fixtures by linking the contact area of a tool and/or fixture to its corresponding reference set, production part model, in process models, or other models, and the like including combinations of the foregoing. Thereby, a contact area geometry exhibiting associative relationships with a modeled part will be automatically updated as the linked part is modified.

For a better understanding of the features of the disclosed embodiment, reference is made to the earlier disclosed horizontally structured modeling and horizontally structured manufacturing process modeling including model link/unlink disclosed above, and as further exemplified below. The exemplary embodiment is described by illustration of additional features subsequent to the abovementioned embodiments. Therefore, the disclosure will be in reference to and illustrated using horizontally structured CAD/CAM modeling and manufacturing process modeling as an example but is not to be construed as limited thereto.

In the disclosed embodiment, horizontally structured modeling methods as disclosed above are employed to facilitate the generation of a product design model for creating an actual part and the tooling and fixtures therefor. In an exemplary embodiment a model is developed to facilitate the creation of the tooling/fixtures corresponding to an actual part modeled or manufactured. In this instance, similar to the models and master process models disclosed earlier includes associative relationships (e.g. links) configured such that changes in model are reflected in all the subsequent linked models or modeling elements, including, but not limited to reference sets, virtual blanks, product models, process models, in-process models or extracts, process sheets, product drawings, and the like including combinations of the foregoing. Moreover, changes in such a model may as disclosed herein, also be reflected in tooling and fixture models, which are likewise, subsequently reflected in tooling and fixture drawings.

Figure 11:
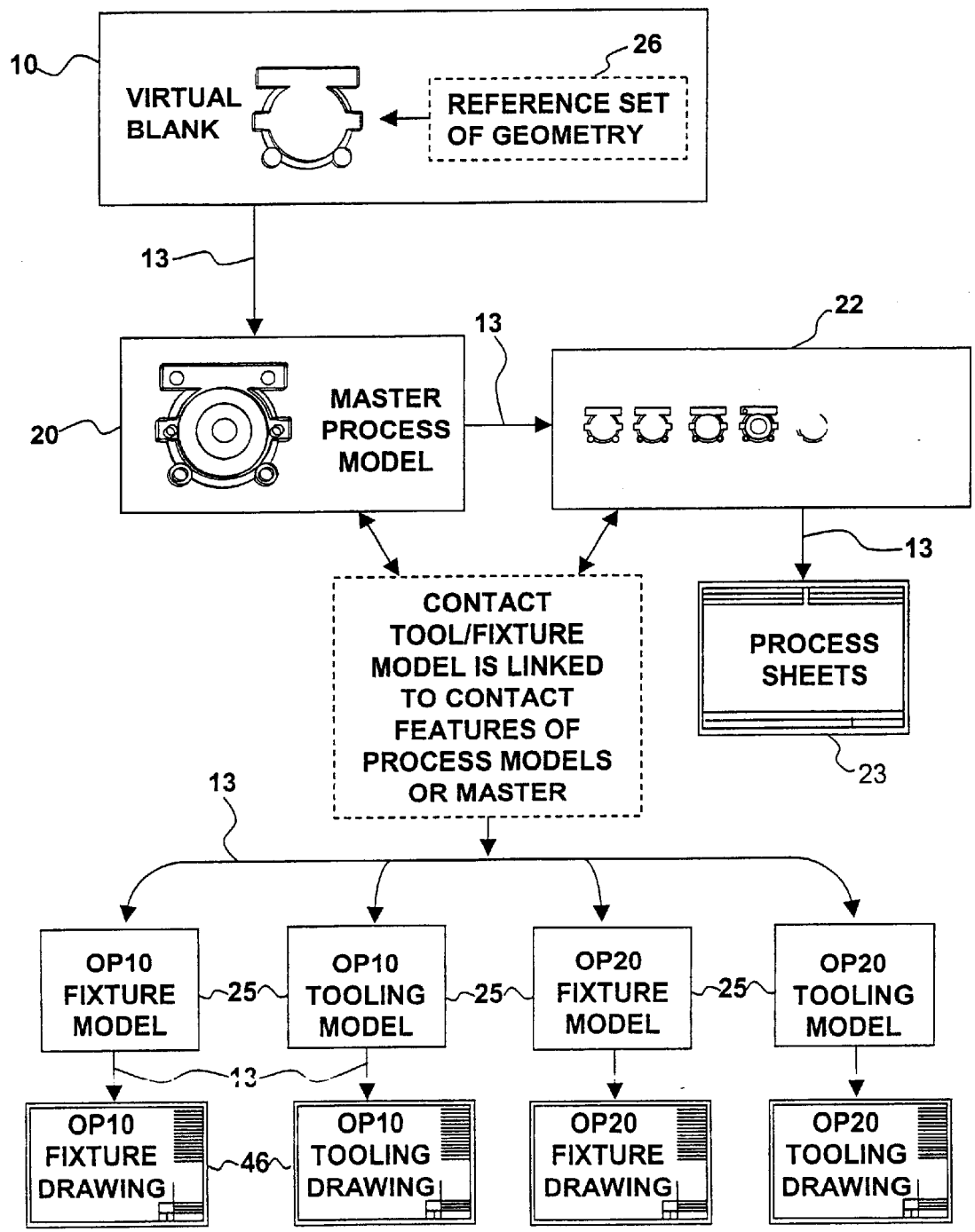
FIG. 11 depicts virtual fixture/tooling design process.

Referring now to FIG. 11, as well as FIGS. 5 and 6 to facilitate the disclosed embodiment, the link/unlink and extraction functions disclosed and described above are once again employed. To execute generating a model configured to facilitate tooling and fixture generation, once again in the same manner as described in the embodiments above, a 3-D parametric solid model representative of a selected contact geometry is selected, created, or generated in a manner similar to those described in the abovementioned embodiments.

In an exemplary embodiment, for a model for a part, selected two dimensional (2-D) contact area geometries and/or surfaces are established for tooling and fixtures. Associative relationships are established with such contact areas and surfaces. The selected contact area 2-D geometries are linked as described earlier, and established a new 2-D reference set. A new file may be created, and the new 2-D reference set is imported to create the virtual tool or fixture. Similar to the abovementioned embodiments, in a Unigraphics® environment, a linked reference geometry is generated via the Wave link function from the new reference set. The linked 2-D reference geometry is then extruded to create a new 3-D parametric solid model for the virtual tool or fixture. This model may be termed a tooling model 25. The extrusion process is a method by which the linked 2-D reference geometry is expanded into a third dimension to 3-D parametric solid model. For example, a 2-D reference geometry of a circle may be extruded into a 3-D solid cylinder. The 3-D solid model now represents the contact tool and corresponds to the feature that is modeled or machined into the actual part.

In an exemplary embodiment the tooling model 25, may be generated as described above. It should be noted that the generation of the tooling model 25 as disclosed herein is illustrative and not limited to the disclosed embodiment. Other methods for generating models such as product models, process models, in-process models as well as extracts and extrusions thereof, and the like, as well as combinations of the foregoing are possible and contemplated. The tooling model 25, a 3-D parametric solid model exhibits characteristics similar to those of other product models or master process models as disclosed in the abovementioned embodiments. Once again, this tooling model 25, logically, is a child of the reference set or referenced geometry 26. The new tooling model 25 includes, but is not limited to the elements, characteristics, and relationships of a part model, reference set 26, virtual blank 10 or casting, or master process model as in the horizontally structured manufacturing process modeling disclosed herein. Moreover, the relationships among the model elements, including, but not limited to, positional, orientational, associative, and the like, as well as combination of the foregoing are also acquired and retained. To avoid duplication, reference may be made to the abovementioned embodiments for insight concerning horizontally structured model characteristics and relationships. Moreover, in a similar fashion to the product modeling and manufacturing process modeling, no mandatory associative relationship need exist among the tooling model 25 and the first, second, and third datum planes 2, 3, and 4 respectively (e.g., FIG. 5). The first, second, and third datum planes 2, 3, and 4 respectively, comprise the reference 3-D coordinate system 6 with respect to which, the form features (e.g. 5a–5g) and manufacturing features 12a–12j (FIG. 6) are positioned and oriented.

Therefore, now the tooling model 25 may be manipulated and modified as required via modeling and virtual machining processes to model the creation of the tool or fixture. The tooling model 25 is utilized to ultimately generate a tool/fixture drawing 46 depicting the design of a tool or fixture. The tool/fixture drawing 46 includes the information required to define the tool/fixture, including, but not limited to, materials, characteristics, dimensions, requirements for the designed part or product, and the like, as well as combinations of the foregoing.

The modeling characteristics described above, once again, provide significant flexibility in the product design modeling, tooling/fixture design, and manufacturing process modeling by allowing a user to interchangeably apply various form features (e.g., 5a–5g) or manufacturing features (e.g., 12a–12j) to a particular model, in this instance a tooling model 25. Likewise, interchangeable tooling models may be generated without impacting the particular manufacturing features applied to the tool or fixture, or datum planes (e.g., 2, 3, and 4) utilized. For example, different reference sets 26 may be selected and a new tooling model 25 generated therefrom and subsequently, the same manufacturing features 12a–12j added with associated datum planes (e.g., 2, 3, and 4). Moreover, in a similar fashion, a variety of interchangeable features may be added to multiple tooling models generated from common referenced geometries.

It is noteworthy to appreciate that the virtual tool and fixture design modeling capability disclosed herein realizes its potential and significance primarily due to the characteristics of the horizontally structured model and manufacturing processes disclosed herein and concurrent product and process design modeling. Specifically, the separation/distribution of associative relationships in the models provides the enhancement achieved. In contrast, in "vertical" modeling methods and tool design, where the traditional approach was to create separate models for product design, tool/fixture design and manufacturing process. If a change or deletion was made in one model, it was necessary to manually update the other models having the same part. Using the horizontally structured modeling disclosed herein and employing the model link/unlink capabilities, it is now possible to generate horizontally structured models linked in a manner such that changes are automatically carried out in both the product design, manufacturing, and tooling/fixture models enabling significantly enhanced design, tooling, and manufacturing processes. Further, it is noteworthy to appreciate that the subsequent process sheets 23, and tooling/fixture drawings 46 that are linked thereto are automatically updated.

It should be noted the disclosed embodiments may be implemented on any CAD/CAM software system that supports the following functions and capabilities: reference planes, datum planes or similar Cartesian equivalents; parametric modeling, or similar equivalent; and feature modeling or similar equivalents.

It should be noted that the term modeling elements or elements of model and similar phraseology have been used throughout this specification. Such terminology is intended to include, but not be limited to: a reference, a reference axis, a reference datum, a datum, a coordinate system, a reference set, a geometry, a linked geometry, a linked body, a virtual blank, a base feature, a product model, a master process model, a master product and process concurrent model, an extract, an in-process model, an extracted body, a form feature, a manufacturing feature, a process sheet, a drawing, a product drawing, a tool drawing, a fixture, a spreadsheet and the like as well as combinations of the foregoing.

It must be noted that the term "machining" has been used throughout this specification, but the teachings of the invention are applicable to any manufacturing process upon a blank, including welding, soldering, brazing & joining, deformations (e.g., crimping operations), stampings (e.g., hole punchings) and the like including combinations of the foregoing.

The disclosed method may be embodied in the form of computer-implemented processes and apparatuses for practicing those processes. The method can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus capable of executing the method. The present method can also be embodied in the form of computer program code, for example, whether stored in a storage medium, loaded into and/or executed by a computer, or as data signal transmitted whether a modulated carrier wave or not, over some transmission medium, such as over electrical wiring or cabling, through fiber optics, or via electromagnetic radiation, wherein, when the computer program code is loaded into and executed by a computer, the computer becomes an apparatus capable of executing the method. When implemented on a general-purpose microprocessor, the computer program code segments configure the microprocessor to create specific logic circuits.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of horizontally structured CAD/CAM modeling and manufacturing for concurrent product and process design, comprising:
   selecting a blank for machining into an actual part establishing a coordinate system;
   creating a master product and process concurrent model comprising:
      a virtual blank corresponding to said blank;
      a manufacturing feature;
      virtual machining of said manufacturing feature into said virtual blank; and
   said manufacturing feature exhibiting an associative relationship with said coordinate system, wherein said associative relationship is a parent/child relationship;
   generating a product drawing of said actual part; and
   generating machining instructions to create said actual part by machining said manufacturing feature into said blank.

2. The method of claim 1 further including said manufacturing feature exhibiting an associative relationship with another said manufacturing feature.

3. The method of claim 2 wherein said associative relationship is a parent/child relationship.

4. The method of claim 1 wherein said virtual blank exhibits an associative relationship with another said manufacturing feature.

5. The method of claim 4 wherein said associative relationship is a parent/child relationship.

6. The method of claim 1 wherein said virtual blank exhibits an associative relationship with said coordinate system.

7. The method of claim 6 wherein said associative relationship is a parent/child relationship.

8. The method of claim 1 further comprising creating extracts from said master product and process concurrent model.

9. The method of claim 8 wherein said extracts comprise replicated models of said master product and process concurrent model at various operations of said manufacturing.

10. The method of claim 8 wherein said extracts are used to generate manufacturing process sheets.

11. The method of claim 1 wherein said virtual blank is positioned and oriented relative to said coordinate system.

12. The method of claim 11 wherein said virtual blank is generated as a three dimensional parametric solid model from a reference set geometry.

13. The method of claim 12 wherein said reference set geometry is defined by dimensional characteristics of a modeled part.

14. The method of claim 1 wherein establishing said coordinate system comprises one or more datum planes.

15. The method of claim 1 wherein said coordinate system comprises:
   creating a first datum plane positioned and oriented relative to a reference;
   creating a second datum plane positioned and oriented relative to said reference; and
   creating a third datum plane positioned and oriented relative to said reference.

16. The method of claim 15 wherein said first datum plane, said second datum plane, and said third datum plane are orthogonal.

17. The method of claim 1 wherein said manufacturing instructions comprise process sheets.

18. The method of claim 1 wherein said product drawings include an associative relationship with said master product and process concurrent model.

19. The method of claim 18 wherein said associative relationship is a parent/child relationship.

20. The method of claim 1 further comprising said master product and process concurrent model links to a process planning system.

21. The method of claim 20 wherein said process planning system comprises automated creation of a manufacturing process plan.

22. A horizontally structured CAD/CAM model for, concurrent product and manufacturing processes design comprising:

a blank for machining into an actual part a coordinate system;

a master product and process concurrent model comprising:
- a virtual blank corresponding to said blank;
- a manufacturing feature;
- said manufacturing feature virtual machined into said virtual blank; and
- said manufacturing feature exhibiting an associative relationship with said coordinate system, wherein said associative relationship is a parent/child relationship.

23. The model of claim 22 further including said manufacturing feature exhibiting an associative relationship with another said manufacturing feature.

24. The model of claim 23 wherein said associative relationship is a parent/child relationship.

25. The model of claim 22 wherein said virtual blank exhibits an associative relationship with another said manufacturing feature.

26. The model of claim 25 wherein said associative relationship is a parent/child relationship.

27. The model of claim 22 wherein said virtual blank exhibits an associative relationship with said coordinate system.

28. The model of claim 27 wherein said associative relationship is a parent/child relationship.

29. The model of claim 22 further comprising extracts created from said master product and process concurrent model.

30. The model of claim 29 wherein said extracts comprise replicated models of said master product and process concurrent model at various operations of said manufacturing.

31. The model of claim 29 wherein said extracts are used to generate manufacturing process sheets.

32. The model of claim 22 wherein said virtual blank is positioned and oriented relative to said coordinate system.

33. The model of claim 32 wherein said virtual blank is generated as a three dimensional parametric solid model from a reference set geometry.

34. The model of claim 33 wherein said reference set geometry is defined by dimensional characteristics of a modeled part.

35. The model of claim 22 wherein said coordinate system comprises one or more datum planes.

36. The model of claim 22 wherein said coordinate system comprises:
- a first datum plane positioned and oriented relative to a reference;
- a second datum plane positioned and oriented relative to said reference; and
- a third datum plane positioned and oriented relative to said reference.

37. The model of claim 36 wherein said first datum plane, said second datum plane, and said third datum plane are orthogonal.

38. The model of claim 22 further including machining instructions to create said actual part by machining said manufacturing feature into said blank.

39. The model of claim 38 wherein said machining instructions include an associative relationship with said master product and process concurrent model.

40. The model of claim 39 wherein said associative relationship is a parent/child relationship.

41. The model of claim 39 wherein said machining instructions comprise process sheets.

42. The model of claim 22 further including a product drawing of said actual part.

43. The model of claim 42 wherein said product drawing includes an associative relationship with said master product and process concurrent model.

44. The model of claim 43 wherein said associative relationship is a parent/child relationship.

45. The model of claim 22 further comprising said master product and process concurrent model links to a process planning system.

46. The model of claim 45 wherein said process planning system comprises automated creation of a manufacturing process plan.

47. A storage medium encoded with a machine-readable computer program code for horizontally structured CAD/CAM modeling and manufacturing for concurrent product and process design, said storage medium including instructions for causing a computer to implement a method comprising:
- selecting a blank for machining into an actual part establishing a coordinate system;
- creating a master product and process concurrent model comprising:
  - a virtual blank corresponding to said blank;
  - a manufacturing feature;
  - virtual machining of said manufacturing feature into said virtual blank;
  - said manufacturing feature exhibiting an associative relationship with said coordinate system, wherein said associative relationship is a parent/child relationship;
- generating a product drawing of said actual part; and
- generating machining instructions to create said actual part by machining said manufacturing feature into said blank.

48. The storage medium of claim 47 further including said manufacturing feature exhibiting an associative relationship with another said manufacturing feature.

49. The storage medium of claim 47 wherein said virtual blank exhibits an associative relationship with another said manufacturing feature.

50. The storage medium of claim 47 wherein said virtual blank exhibits an associative relationship with said coordinate system.

51. The storage medium of claim 47 further comprising instructions for causing a computer to implement a method comprising creating extracts from said master product and process concurrent model.

52. The storage medium of claim 51 wherein said extracts comprise replicated models of said master product and process concurrent model at various operations of said manufacturing.

53. The storage medium of claim 51 wherein said extracts are used to generate manufacturing process sheets.

54. The storage medium of claim 47 wherein said virtual blank is positioned and oriented relative to said coordinate system.

55. The storage medium of claim 54 wherein said virtual blank is generated as a three dimensional parametric solid model from a reference set geometry.

56. The storage medium of claim 47 wherein establishing said coordinate system comprises one or more datum planes.

57. The storage medium of claim 47 wherein said coordinate system comprises:
- creating a first datum plane positioned and oriented relative to a reference;
- creating a second datum plane positioned and oriented relative to said reference; and creating a third datum plane positioned and oriented relative to said reference.

58. The storage medium of claim 47 wherein said manufacturing instructions comprise process sheets.

59. The storage medium of claim 47 wherein said product drawings include an associative relationship with said master product and process concurrent model.

60. The storage medium of claim 47 further comprising instructions for causing a computer to implement a method comprising said master product and process concurrent model including links to a process planning system.

61. The storage medium of claim 60 wherein said process planning system comprises automated creation of a manufacturing process plan.

62. A computer data signal embodied in a computer readable medium horizontally structured CAD/CAM modeling and manufacturing for concurrent product and process design, said computer data signal comprising code configured to cause a computer to implement a method comprising:
   selecting a blank for machining into an actual part establishing a coordinate system;
   creating a master product and process concurrent model comprising:
      a virtual blank corresponding to said blank;
      a manufacturing feature;
      virtual machining of said manufacturing feature into said virtual blank; and
      said manufacturing feature exhibiting an associative relationship with said coordinate system, wherein said associative relationship is a parent/child relationship;
   generating a product drawing of said actual part; and
   generating machining instructions to create said actual part by machining said manufacturing feature into said blank.

63. The computer data signal of claim 62, further including said manufacturing feature exhibiting an associative relationship with another said manufacturing feature.

64. The computer data signal of claim 62 wherein said virtual blank exhibits an associative relationship with another said manufacturing feature.

65. The computer data signal of claim 62 wherein said virtual blank exhibits an associative relationship with said coordinate system.

66. The computer data signal of claim 62 further comprising code configured to cause a computer to implement a method comprising creating extracts from said master product and process concurrent model.

67. The computer data signal of claim 66 wherein said extracts comprise replicated models of said master product and process concurrent model at various operations of said manufacturing.

68. The computer data signal of claim 66, wherein said extracts are used to generate manufacturing process sheets.

69. The computer data signal of claim 62 wherein said virtual blank is positioned and oriented relative to said coordinate system.

70. The computer data signal of claim 69 wherein said virtual blank is generated as a three dimensional parametric solid model from a reference set geometry.

71. The computer data signal of claim 70 wherein said reference set geometry is defined by dimensional characteristics of a modeled part.

72. The computer data signal of claim 62, wherein establishing said coordinate system comprises one or more datum planes.

73. The computer data signal of claim 62 wherein said coordinate system comprises:
   creating a first datum plane positioned and oriented relative to a reference;
   creating a second datum plane positioned and oriented relative to said reference; and
   creating a third datum plane positioned and oriented relative to said reference.

74. The computer data signal of claim 73 wherein said first datum plane, said second datum plane, and said third datum plane are orthogonal.

75. The computer data signal of claim 62 wherein said manufacturing instructions comprise process sheets.

76. The computer data signal of claim 62 wherein said product drawings include an associative relationship with said master product and process concurrent model.

77. The computer data signal of claim 62 further comprising code configured to cause a computer to implement a method comprising said master product and process concurrent model including links to a process planning system.

78. The computer data signal of claim 77 wherein said process planning system comprises automated creation of a manufacturing process plan.

* * * * *